(12) United States Patent  (10) Patent No.: US 7,643,066 B2
Henninger, III et al.  (45) Date of Patent: Jan. 5, 2010

(54) METHOD AND APPARATUS FOR PRODUCING FRAME ACCURATE POSITION DATA IN A PTZ DOME CAMERA WITH OPEN LOOP CONTROL

(75) Inventors: Paul E Henninger, III, Lititz, PA (US); Mark Bell, Airville, PA (US); Bruce Magid, Lancaster, PA (US)

(73) Assignee: Robert Bosch GmbH, Stuttgart (DE)

( * ) Notice: Subject to any disclaimer, the term of this patent is extended or adjusted under 35 U.S.C. 154(b) by 613 days.

(21) Appl. No.: 11/294,847

(22) Filed: Dec. 6, 2005

(65) Prior Publication Data

US 2006/0203098 A1   Sep. 14, 2006

Related U.S. Application Data

(63) Continuation-in-part of application No. 11/200,396, filed on Aug. 9, 2005, which is a continuation-in-part of application No. 10/781,968, filed on Feb. 19, 2004, now Pat. No. 7,382,400.

(51) Int. Cl.
*H04N 5/232* (2006.01)
*H04N 5/262* (2006.01)

(52) U.S. Cl. .............................. 348/211.99; 348/240.99

(58) Field of Classification Search ............ 348/211.99, 348/211.4, 169, 171, 333.03, 240.99
See application file for complete search history.

(56) References Cited

U.S. PATENT DOCUMENTS

| | | |
|---|---|---|
| 5,434,617 A | 7/1995 | Bianchi |
| 5,625,410 A | 4/1997 | Washino et al. |
| 6,381,278 B1 | 4/2002 | Shin et al. |
| 6,442,203 B1 | 8/2002 | Demos |
| 6,727,938 B1 * | 4/2004 | Randall ...................... 348/143 |
| 6,877,134 B1 | 4/2005 | Fuller et al. |
| 2001/0018693 A1 | 8/2001 | Jain et al. |
| 2002/0008758 A1 | 1/2002 | Broemmelsiek et al. |
| 2003/0103138 A1 | 6/2003 | Assayag et al. |
| 2003/0146915 A1 | 8/2003 | Brook et al. |
| 2003/0174773 A1 | 9/2003 | Comaniciu et al. |
| 2004/0100560 A1 | 5/2004 | Stavely et al. |
| 2004/0100563 A1 * | 5/2004 | Sablak et al. ............ 348/211.4 |
| 2004/0109059 A1 | 6/2004 | Kawakita |
| 2004/0114799 A1 | 6/2004 | Xu |
| 2005/0157169 A1 | 7/2005 | Brodsky et al. |

FOREIGN PATENT DOCUMENTS

GB   2305051 A   3/1997

(Continued)

*Primary Examiner*—Nhan T Tran
*Assistant Examiner*—Akshay Trehan
(74) *Attorney, Agent, or Firm*—Baker & Daniels LLP

(57) ABSTRACT

A method of processing video images includes capturing a first image with a camera having a first field of view. The capturing occurs at a first point in time. Commands are transmitted to the camera to make pan, tilt and zoom movements. A second image is captured with the camera at a second point in time. The second point in time is after the movements have commenced. A second field of view of the camera is calculated at the second point in time. The calculating is based upon the commands. The second image is processed based upon the first field of view and the calculated second field of view.

28 Claims, 12 Drawing Sheets

FOREIGN PATENT DOCUMENTS

| | | |
|---|---|---|
| GB | 2316255 A | 2/1998 |
| GB | 2411310 A | 8/2005 |
| GB | 2414885 A | 12/2005 |
| JP | 08-123784 A | 5/1996 |
| WO | WO 98/47117 A1 | 10/1998 |
| WO | WO 2004/068403 A2 | 8/2004 |

* cited by examiner

METHOD AND APPARATUS FOR PRODUCING FRAME ACCURATE POSITION DATA IN A PTZ DOME CAMERA WITH OPEN LOOP CONTROL

CROSS REFERENCE TO RELATED APPLICATIONS

This application is a Continuation-in-part of U.S. patent application Ser. No. 11/200,396, entitled IMAGE STABILIZATION SYSTEM AND METHOD FOR A VIDEO CAMERA, filed on Aug. 9, 2005, which is hereby incorporated herein by reference, and which is a Continuation-in-part of U.S. patent application Ser. No. 10/781,968, entitled IMAGE STABILIZATION SYSTEM AND METHOD FOR A VIDEO CAMERA, filed on Feb. 19, 2004, which is also hereby incorporated herein by reference.

BACKGROUND OF THE INVENTION

1. Field of the Invention

The present invention relates to a video camera system, and, more particularly, to an apparatus for providing camera position data, including pan, tilt and zoom position data, for use in video content analysis.

2. Description of the Related Art

There are numerous known video surveillance systems which may be used to track a moving object such as a person or vehicle. Some such systems utilize a fixed camera having a stationary field of view (FOV). To fully cover a given surveillance site with a fixed camera system, however, it will oftentimes be necessary to use a significant number of fixed cameras.

Movable cameras which may pan, tilt and/or zoom may also be used to track objects. The use of a PTZ (pan, tilt, zoom) camera system will typically reduce the number of cameras required for a given surveillance site and also thereby reduce the number and cost of the video feeds and system integration hardware such as multiplexers and switchers associated therewith. Control signals for directing the pan, tilt, zoom movements typically originate from a human operator via a joystick or from an automated video tracking system.

A problem is that, in processing the images being acquired by the video camera, it is often necessary to ascertain the field of view of each image with a high degree of accuracy, and virtually in real time. For example, when applying a mask to the acquired images, it is important to maintain the mask in position over the objects to be masked throughout pan, tilt and zoom camera movements which may constantly change the field of view of the camera. The use of privacy masks and virtual masks is disclosed in U.S. patent application Ser. No. 11/199,762, entitled VIRTUAL MASK FOR USE IN AUTOTRACKING VIDEO CAMERA IMAGES, filed on Aug. 9, 2005, which is hereby incorporated by reference herein. Automated video tracking is another application in which it may be necessary to keep track of the field of view of the camera. More particularly, in order to determine the magnitude and direction of movement of an object of interest that is being tracked, it may be necessary to account for changes in the field of view of the camera from image to image. For example, changes in the field of view may make it appear that an object of interest is moving from image to image, when in fact it is not.

Corner matching is a conventional technique for identifying stationary objects in acquired images and deriving the change of the field of view from changes in the location of the stationary object from image to image. More particularly, a corner of a stationary object, or an entire stationary object, may be located in sequentially acquired images, and changes in the field of view of the camera between the two images may be derived from changes in the location and possibly size of the stationary object between the two images. A problem is that corner matching is computationally intensive, and diverts processing power from other video content analysis. Another problem is that the success of corner matching depends upon the content of the FOV. In particular, it requires stationary object(s) to be present in the FOV.

What is needed in the art is a video system capable of ascertaining changes in the field of view of the camera essentially in real time, and without performing corner matching.

SUMMARY OF THE INVENTION

The present invention provides a video system in which the camera's field of view, defined by the pan position, tilt position and zoom position of the camera, may be provided on a frame-by-frame basis. A processing device analyzes pan, tilt, and zoom movement commands sent to the camera and may derive therefrom the field of view corresponding to any image.

A tracking algorithm may require a processor-intensive corner matching routine to assure the correct video is being compared for object motion tracking. In order to free up processor resources to obtain a better tracking rate, the present invention provides a method of matching the video frame being analyzed to the actual pan tilt and zoom positions. The present invention provides a system approach and architecture that allows a video content analysis engine in a digital signal processor to use frame accurate position data in conjunction with a PTZ camera instead of a corner matching routine. The present invention also allows the data to be shared with a host processor for use in privacy masking and virtual masking applications while eliminating variability of reporting time on the pan and tilt data. The present invention provides a method of determining frame accurate position data in an open loop system.

The invention enables a PTZ dome surveillance camera system to use frame accurate position data (pan, tilt, and zoom) to eliminate corner matching software processing when processing digital video frame data to determine movement in three axes from a previously processed position or frame.

Multiple processors may have access to the pan and tilt data via separate mechanisms. A frame interrupt may be used by a host processor to retrieve pan and tilt data for privacy masking purposes from an FPGA.

The invention comprises, in one form thereof a method of processing video images, including capturing a first image with a camera having a first field of view. The capturing occurs at a first point in time. Commands are transmitted to the camera, such as to motors actuating the camera, to make pan, tilt and zoom movements. A second image is captured with the camera at a second point in time. The second point in time is after the movements have commenced. A second field of view of the camera is calculated at the second point in time. The calculating is based upon the commands. The second image is processed based upon the first field of view and the calculated second field of view.

The invention comprises, in another form thereof, a video system including a video camera having an image-capturing device for capturing images. Each captured image is associated with a field of view of the camera. A display device displays the images captured by the camera. An actuating device causes the camera to execute pan, tilt and zoom commands to thereby change the field of view of the camera. A camera module automatically produces camera zoom position information based upon the zoom commands. A processing device is operably coupled to the camera and to the display device wherein the processing device receives images captured by the camera. The processing device is operable to calculate the field of view of the video camera based upon the pan commands, the tilt commands, and the camera zoom position information.

The invention comprises, in yet another form thereof, a video system including a video camera having an image-capturing device for capturing images. Each captured image is associated with a field of view of the camera. A display device displays the images captured by the camera. An actuating device causes the camera to execute pan, tilt and zoom commands to thereby change the field of view of the camera. A processing device is operably coupled to the camera and to the display device wherein the processing device receives images captured by the camera. The processing device is operable to calculate the field of view of the video camera as a function of time dependent upon the pan, tilt and zoom commands. The processing device is also operable to output both the calculated field of view and a qualification of the calculated field of view. The qualification is based upon a point in time associated with the calculated field of view.

An advantage of the present invention is that the field of view may be accurately determined without having to perform corner matching.

Another advantage is that frame accurate position data may be shared with a host processor for use in masking applications while reducing variability of reporting time on the pan and tilt data.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 6 is a histogram used in the analysis of two images.

Figure 1:
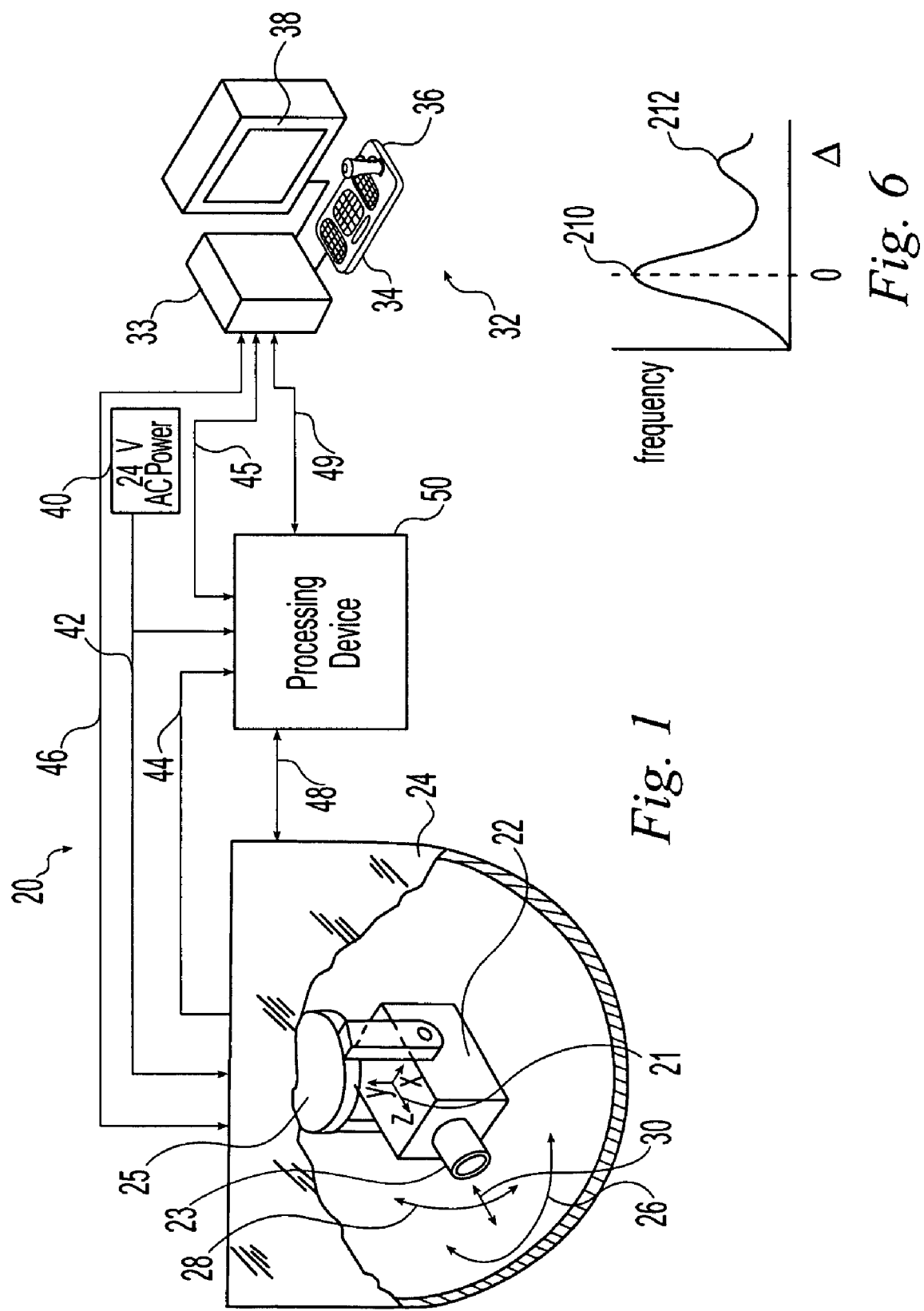
FIG. 1 is a schematic view of a video surveillance system in accordance with the present invention.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DESCRIPTION OF THE PRESENT INVENTION

In accordance with the present invention, a video surveillance system 20 is shown in FIG. 1. System 20 includes a camera 22 which is located within a partially spherical enclosure 24 and mounted on support 25. Stationary support 25 may take many forms, such as an outwardly extending support arm extending from an exterior edge of a building which may subject the supported camera to unintentional movement resulting from wind, vibrations generated by the camera motors, nearby machinery or a myriad of other sources. Enclosure 24 is tinted to allow the camera to acquire images of the environment outside of enclosure 24 and simultaneously prevent individuals in the environment being observed by camera 22 from determining the orientation of camera 22. Camera 22 includes a controller and motors which provide for the panning, tilting and adjustment of the focal length of camera 22. Panning movement of camera 22 is represented by arrow 26, tilting movement of camera 22 is represented by arrow 28 and the changing of the focal length of the lens 23 of camera 22, i.e., zooming, is represented by arrow 30. As shown with reference to coordinate system 21, panning motion may track movement along the x axis, tilting motion may track movement along the y-axis and focal length adjustment may be used to track movement along the z-axis. In the illustrated embodiment, camera 22 and enclosure 24 may be an AutoDome® brand camera system, such as the G3 or G4 AutoDome® camera and enclosure, which are available from Bosch Security Systems, Inc. formerly Philips Communication, Security & Imaging, Inc. having a place of business in Lancaster, Pa. The basic, advanced, or other models of the G3 or G4 AutoDome® camera may be suitable for use in conjunction with the present invention. A camera suited for use with present invention is described by Sergeant et al. in U.S. Pat. No. 5,627,616 entitled Surveillance Camera System which is hereby incorporated herein by reference.

System 20 also includes a head end unit 32. Head end unit 32 may include a video switcher or a video multiplexer 33. For example, the head end unit may include an Allegiant® brand video switcher available from Bosch Security Systems, Inc. formerly Philips Communication, Security & Imaging, Inc. of Lancaster, Pa. such as a LTC 8500 Series Allegiant® Video Switcher which provides inputs for up to 64 cameras and may also be provided with eight independent keyboards and eight monitors. Head end unit 32 includes a keyboard 34 and joystick 36 for operator input. Head end unit 32 also includes a display device in the form of a monitor 38 for viewing by the operator. A 24 volt a/c power source 40 is provided to power both camera 22 and a processing device 50 that is operably coupled to both camera 22 and head end unit 32.

Illustrated system 20 is a single camera application, however, the present invention may be used within a larger surveillance system having additional cameras which may be either stationary or moveable cameras or some combination thereof to provide coverage of a larger or more complex surveillance area. One or more VCRs or other form of analog or digital recording device may also be connected to head end unit 32 to provide for the recording of the video images captured by camera 22 and other cameras in the system.

Figure 2:
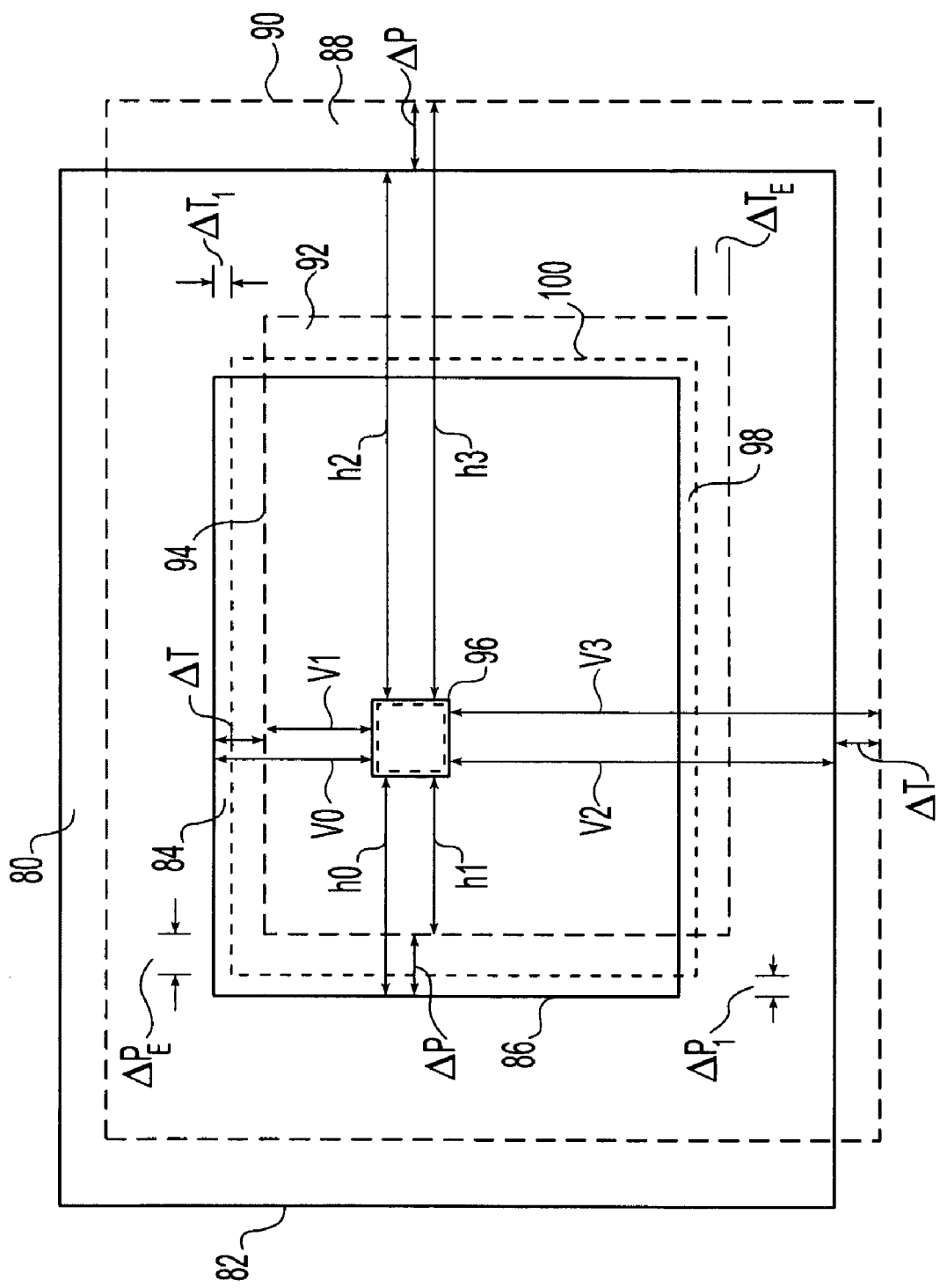
FIG. 2 is a schematic view illustrating a change in a field of view of the camera of FIG. 1 and the resulting images captured by the camera.

The general concepts underlying the operation of an image stabilization system in accordance with the present invention will now be discussed with reference to FIGS. 2 and 3. Camera 22 includes an image-capturing device such as a charge coupled device (CCD) that acquires a four-sided CCD video image 80 defined by CCD image boundary 82. Processing device 50 identifies or selects a central portion of CCD image 80 to be displayed on a screen of monitor 38 for viewing by an operator of system 20. More particularly, processing device 50 identifies a display image 84 defined by display image boundary 86 for viewing on the screen of monitor 38. In one embodiment, the selected portion of the CCD video image, i.e., display image 84, includes approximately between 60% and 90% of the CCD video image. In a preferred embodiment, CCD image 80 can be approximately 30% larger than a display image 84 defined by display image boundary 86. In other words, in a preferred embodiment, approximately 23% of CCD image 80 is not displayed on the screen of monitor 38. However, for ease of illustration, CCD image 80 is shown in FIG. 2 to be approximately between 100% and 200% larger than display image 84. By utilizing a display image that is smaller than the CCD image, processing device 50 can adjust the positions of the boundaries defining the display image relative to the entire CCD image for sequentially acquired images in order to counteract the effects of support arm vibration and other unintended movements of the camera, as described in more detail below.

After a period of time, the field of view (FOV) of camera 22 changes such that a second four-sided CCD image 88 is acquired. A second CCD image boundary 90 defines the limits of the CCD image 88. FIG. 2 schematically illustrates the two images 80, 88 having different fields of view acquired by camera 22 and the extent to which the two images overlap.

The change in the FOV of camera 22 can be due to both intended and unintended, i.e., inadvertent, movements of camera 22. The intended movement of camera 22 that occurs can be due to panning, tilt and zoom control signals sent to camera 22 from head end unit 32. That is, the field of view of camera 22 can be varied by use of the control signals. Any unintended or inadvertent movement of camera 22 may be due to external forces, such as air movement or mounting arm vibration.

An intermediate, unadjusted display image 92 from CCD image 88, defined by an intermediate, unadjusted display image boundary 94, is identified by processing device 50 but is not displayed on the screen of monitor 38. Unadjusted display image 92 includes a portion of CCD image 88 that corresponds to the portion of CCD image 80 that is included in display image 84. That is, the relative position of display image 92 to CCD image boundary 90 is the same as the relative position of display image 84 to CCD image boundary 82, with the distances between the display image boundaries and the corresponding CCD image boundaries being approximately equal for display images 84 and 92. For example, display images 84 and 92 may each be centered in their respective CCD images 80, 88.

Figure 3:
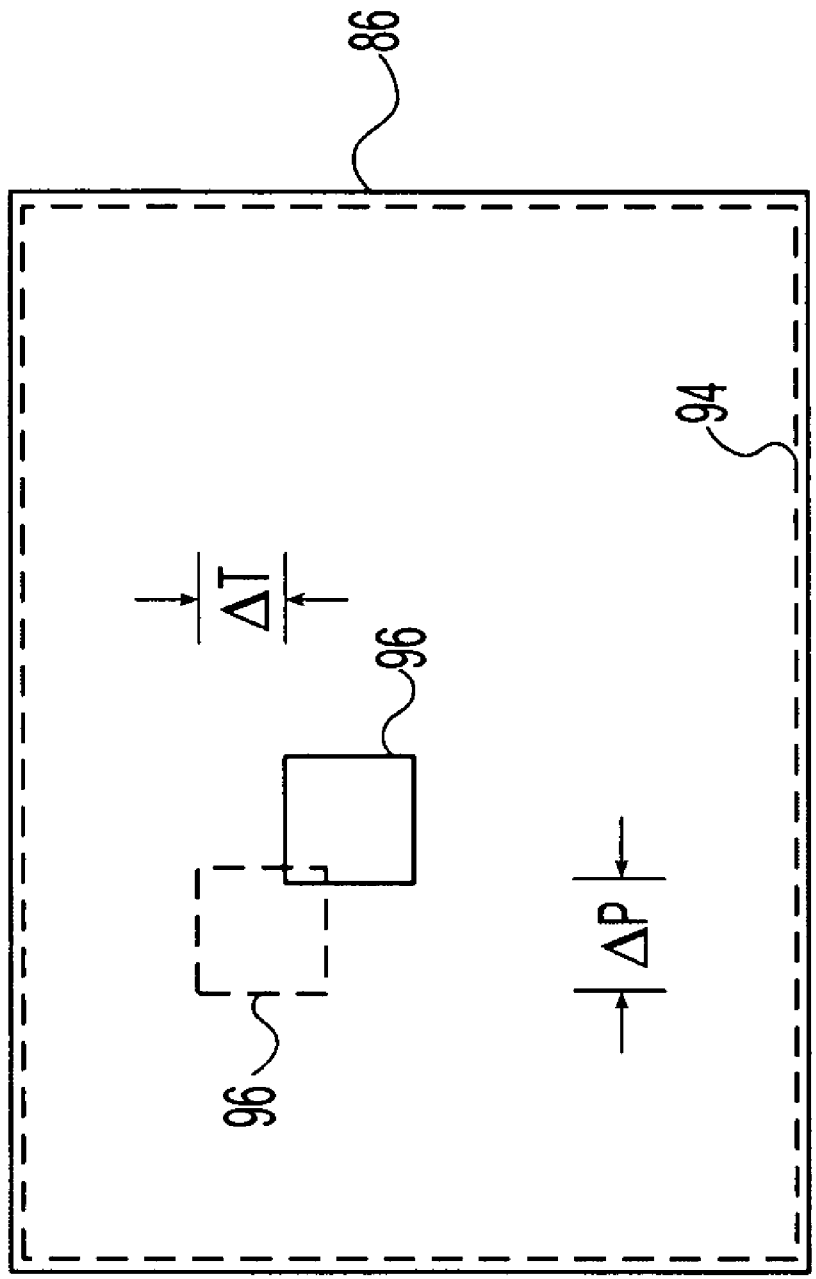
FIG. 3 is a schematic view of a portion of the captured images of FIG. 2.

FIGS. 2 and 3 schematically illustrate two images acquired by camera 22 and the effects and relationship between the intended motion of the camera, the actual motion of the camera and the unintentional motion of the camera with regard to these two images. A common stationary feature 96 is identified in each of these images to clarify the relative movement of the FOV that has taken place between the acquisition of the two images. The same stationary feature 96 is shown in both solid and dashed lines in FIG. 2 to indicate that feature 96 is present in both CCD image 80 and CCD image 88. The actual horizontal translation $\Delta P$ (generally corresponding to panning movement of camera 22) and vertical translation $\Delta T$ (generally corresponding to tilting movement of camera 22) of feature 96 relative to the CCD image boundaries 82, 90 that actually took place in the time period between the acquisition of the two CCD images 80, 88 is schematically represented in FIG. 2.

In FIG. 2, the positions CCD images 80 and 88 are depicted relative to stationary feature 96. As can be seen in FIG. 2, images 80 and 88 overlap to a considerable extent but the FOV of camera 22 has changed between the acquisition of CCD image 80 to the more recently captured CCD image 88. The change in the FOV of camera 22 is best shown in FIG. 3, wherein display images 84, 92 are superimposed on one another as they would successively appear on the screen of monitor 38 without any adjustment of display image boundaries 86, 94 for image stabilization purposes.

The vertical, i.e., in the tilt direction, change in position $\Delta T$, and the horizontal, i.e., in the panning direction, change in position $\Delta P$ of feature 96 relative to the display image boundary 86, 94 is representative of the vertical (tilt) movement and horizontal (pan) movement of camera 22 that occurred between the capturing of CCD images 80 and 88 by camera 22 and is equivalent to the change in position of feature 96 relative to CCD image boundaries 82 and 90.

In other words, $\Delta T$ is equivalent to the difference between vertical distances v0 and v1 between feature 96 and corresponding horizontal edges of display image boundaries 86, 94, respectively. That is, $\Delta T = |v0 - v1|$. Similarly, $\Delta P$ is equivalent to the difference between horizontal distances h0 and h1 between feature 96 and corresponding vertical edges of display image boundaries 86, 94, respectively. That is, $\Delta P = |h0 - h1|$. Alternatively, $\Delta T$ may be said to be equivalent to the difference between vertical distances v2 and v3 between feature 96 and corresponding horizontal edges of CCD image boundaries 82, 90, respectively. That is, $\Delta T = |v2 - v3|$. Similarly, $\Delta P$ is equivalent to the difference between horizontal distances h2 and h3 between feature 96 and corresponding vertical edges of CCD image boundaries 82, 90, respectively. That is, $\Delta P = |h2 - h3|$.

The determination of the values of $\Delta T$ and $\Delta P$ is performed by processing device 50 based upon an analysis of the content of the two CCD images 80, 88. Matching techniques which may be used to register or align two images having overlapping content are well known in the art and used in a wide variety of computer vision and video processing applications. Two well-known methods are normalized correlation-based template matching and feature matching. For example, the identification of a stationary object such as feature 96 in each of the two images might be accomplished using a feature matching approach. One well known method of identifying features in video images is a corner detection method which analyzes the images to identify locations, or corners, in the image where there is a relatively sharp change in the intensity level of nearby pixels. These corners are then compared and matched in the two separate images.

Although such a feature matching approach can be employed with the present invention, the illustrated embodiment employs a template matching approach instead. Various template matching approaches are known in the art. Two well known approaches to template matching are a sum of square differences approach and a normalized cross-correlation approach. A sum of square differences approach typically relies upon the following mathematical relationship:

$$E = \sum_i \sum_j |(x'_i, y'_j) - M(x_i, y_j)|^2 \qquad (1)$$

where E is the total error, I is the image, M is the model template, (x, y) are the model image coordinates, and (x', y') are the transformed image coordinates. To register the two images, the total error E is minimized. In the example of FIG. 2, first display image 84 corresponds to the model template, M, the difference between x and x' corresponds to ΔP and the difference between y and y' corresponds to ΔT. The relation between the transformed image coordinates and the model image coordinates is defined by a motion model. Different motion models can be used and an affine transformation as presented below models rotation, shearing, and translation:

$$\begin{bmatrix} x' \\ y' \\ 1 \end{bmatrix} = \begin{bmatrix} a_0 & a_1 & a_2 \\ a_3 & a_4 & a_5 \\ 0 & 0 & 1 \end{bmatrix} \begin{bmatrix} x \\ y \\ 1 \end{bmatrix} \qquad (2)$$

This motion model (2) requires at least 3 point pairs between the current image (second CCD image 88) and the model image (first display image 84).

Although a sum of square differences approach can be used with the present invention, the illustrated embodiment utilizes a normalized cross-correlation approach instead. Template matching using cross-correlation is based upon squared Euclidean distances:

$$d^2_{f,t}(u, v) = \sum_{x,y} [f(x, y) - t(x - u, y - v)]^2 \qquad (3)$$

Wherein f is the image, e.g., second CCD image 88, and the summation is over x, y under the window, e.g., first display image 84, containing a feature t positioned at (u, v). The expansion of $d^2$ provides:

$$d^2_{f,t}(u, v) = \sum_{x,y} \begin{bmatrix} f^2(x, y) - 2f(x, y)t(x - u, y - v) + \\ t^2(x - u, y - v) \end{bmatrix} \qquad (4)$$

The term $\Sigma t^2(x-u, y-v)$ is constant. If the term $\Sigma f^2(x, y)$ is approximately constant then a measure of the similarity between the image and the feature is provided by the remaining cross-correlation term:

$$c(u, v) = \sum_{x,y} f(x, y)t(x - u, y - v) \qquad (5)$$

There are several disadvantages, however, to using this term for template matching and, oftentimes, a correlation coefficient is used instead. The correlation coefficient may be obtained by normalizing the image and feature vectors to unit length, providing:

$$\gamma(u, v) = \frac{\sum_{x,y} [f(x, y) - \bar{f}_{u,v}][t(x - u, y - v) - \bar{t}]}{\left\{ \sum_{x-y} [f(x, y) - \bar{f}_{u,v}]^2 \sum_{x,y} [t(x - u, y - v) - \bar{t}]^2 \right\}^{0.5}} \qquad (6)$$

where $\bar{t}$ is the mean of the feature and $\bar{f}_{u,v}$ is the mean of f(x, y) in the region under the feature. This relationship, known to those having ordinary skill in the art, is commonly referred to as normalized cross-correlation. By maximizing the normalized correlation between the first display image 84 and the second CCD image 88, processing device 50 can determine a value for ΔT and ΔP.

In addition to determining the actual change in the field of view as indicated by ΔT and ΔP, processing device 50 also determines the intended change, if any, in the field of view, FOV, of camera 22. In FIG. 2, the intended change in the FOV in the vertical (tilting) and horizontal (panning) directions respectively correspond to $\Delta T_1$ and $\Delta P_1$. For example, when the camera is intentionally panned or tilted, there will be a change of the FOV of the camera. In FIG. 2, this intentional change in the FOV of the camera corresponds to $\Delta T_1$ and $\Delta P_1$ wherein $\Delta T_1$ is a vertical image distance corresponding to the intentional tilting of camera 22 and $\Delta P_1$ is a horizontal image distance corresponding to the intentional panning of camera 22.

In the illustrated embodiment, camera 22 communicates to processing device 50 frame-based synchronized information on the pan, tilt and zoom position of camera 22 with each image acquired by camera 22. Processing device 50 utilizes the pan, tilt and zoom settings associated with each of the two images 80, 88 to determine the intended change, if any, in the pan, tilt and zoom positions of camera 22 and, thus, the magnitude and direction of $\Delta T_1$ and $\Delta P_1$.

The intended change in the FOV can also be determined by alternative methods. For example, processing device 50 can analyze the panning, tilt and zoom control signals sent to camera 22 to determine the intended change in the FOV. Such control signals may originate from head end unit 32, e.g., due to the manual manipulation of joystick 36, and be communicated to processing device 50 directly or through camera 22. Alternatively, the camera control signals may originate from processing device 50, e.g., camera control signals generated by an automatic intruder tracking program. Alternatively, the camera control signals may be originated by another source and communicated to processing device 50 or processing device 50 may determine the intended change in the display image by analyzing other data gathered from system 20.

Once both the actual change in the FOV of the camera, as represented by ΔT and ΔP, and the intended change in the FOV of the camera, as represented by $\Delta T_1$ and $\Delta P_1$, are known, it can be determined whether there has been any unintentional movement of the camera in either or both of the vertical (tilting) and horizontal (panning) directions. The values $\Delta T_E$ and $\Delta P_E$ represent the difference between the actual change in the FOV ($\Delta T$ and $\Delta P$) and the intended change in the FOV ($\Delta T_1$ and $\Delta P_1$) for the two sequential images, i.e., the change in the FOV that is due to the inadvertent movement of camera 22. Processing device 50 compensates for such inadvertent movement of camera 22 by adjusting the relative position of the display image within the CCD image based upon the values of $\Delta T_E$ and $\Delta P_E$. In FIG. 2, an adjusted display image 98 defined by adjusted display boundary 100 would be displayed on the screen of monitor 38.

When communicating images to head end unit 32 for display on monitor screen 38, processing device 50 can clip the images and forward only the selected display image portion, e.g., display images 84, 98, or it may forward the entire CCD image, e.g., CCD images 80, 88, together with the coordinates of the display image boundaries, e.g., display boundaries 86, 100.

As long as the entire adjusted display image 98 is available on CCD image 88, adjusted display image 98 can be displayed on the screen of monitor 38. The outer edges of the selected portion of the video image, i.e., the display image boundary, and the outer edges of the CCD video image are separated by margins on all four sides. The adjustment of the display image is, thus, limited to width of the corresponding margin. That is, the extent to which the display image can be repositioned within the CCD image is limited by a threshold value corresponding to the size difference between the display image and the CCD image. The size of the margins may be selected based upon the anticipated magnitude of the vibrations or other unintended movements that will be encountered by the surveillance camera.

A key feature provided by the present invention is that it not only stabilizes the display image while the camera is stationary, but also provides for the stabilization of the display image while the FOV of the camera is being adjusted. As described above, in addition to the adjustable panning and tilt angles of camera 22, camera 22 also has an adjustable zoom setting. The preceding discussion concerning the determination of $\Delta T$ and $\Delta P$; $\Delta T_1$ and $\Delta P_1$; and $\Delta T_E$ and $\Delta P_E$ did not specifically address the situation where the change in the FOV involves a change in the zoom setting of camera 22, i.e., a change in the focal length of the lens of camera 22, in addition to panning or tilting movement of the camera. The vibration of camera 22 or of the structure supporting camera 22 is not likely to result in an unintentional change in the zoom setting of camera 22. As a result, the zoom setting communicated from camera 22 to processing device 50 is assumed to be correct.

An intentional and precise change in the zoom setting between the acquisition of images 80, 88, however, will impact the image stabilization process by altering the relative size of the content of images 80, 88. Alternative embodiments of the present invention may address such a change in the zoom setting of camera 22 in alternative manners. The simplest approach is to only perform the image stabilization process when the two sequential images being analyzed by processing device 50 have the same zoom setting. This approach will suspend the operation of the image stabilization process when the focal length of camera 22 is being actively changed. For some applications where the focal length of the camera is subject to relatively few changes or where the camera does not include an adjustable focal length, this approach may not appreciably degrade the value of the image stabilization system. Moreover, when the focal length is being actively changed, the image is undergoing a noticeable transformation which is typically brief and wherein small unintentional image translations will not be as distractive as when the camera is stationary or being subjected to only panning and/or tilting movements.

It is also possible to continue to perform the image stabilization process as the focal length of camera 22 is being changed. If this approach is taken, at least one of the two images being compared, i.e., first and second CCD images 80, 88, must be transformed so that the objects depicted in each of the images are depicted at a common scale and can be aligned. To accomplish this, geometric transforms may be used to modify the position of each pixel within the image. Another way to think of this is as the moving of all pixels from one location to a new location based upon the camera motion. One such method for transforming a first image to align it with a second image wherein the camera was adjusted between the acquisition of the two images is discussed by Trajkovic in U.S. Pat. App. Pub. No. 2002/0167537 A1 entitled Motion-Based Tracking With Pan-Tilt-Zoom Camera which is hereby incorporated herein by reference.

Alignment of consecutive images acquired at different focal lengths requires translation as well as scaling and rotation of one image to align it with the previous image. Of these three operations translation is the simplest. Warping, a process in which each pixel is subjected to a general user-specified transformation, may be necessary to reduce, expand, or modify an image to a standard size before further processing can be performed. Images produced by such geometric operations are approximations of the original. The mapping between the two images, the current image, e.g., $I_1$, and a reference image, e.g., $I_2$, is defined by:

$$p' = sQRQ^{-1}p = Mp \tag{7}$$

where p and p' denote the homographic image coordinates of the same world point in the first and second images, s denotes the scale image (which corresponds to the focal length of the camera), Q is the internal camera calibration matrix, and R is the rotation matrix between the two camera locations.

Alternatively, the relationship between the image projection coordinates p and p', i.e., pixel locations (x, y) and (x', y'), of a stationary world point in two consecutive images may be written as:

$$x' = \frac{m_{11}x + m_{12}y + m_{13}}{m_{31}x + m_{32}y + m_{33}} \tag{8}$$

$$y' = \frac{m_{21}x + m_{22}y + m_{23}}{m_{31}x + m_{32}y + m_{33}} \tag{9}$$

Where $\lfloor m_{ij} \rfloor_{3\times 3}$ is the homography matrix M that maps (aligns) the first image to the second image.

The main task in such image alignment is to determine the matrix M. From equation (7), it is clear that given s, Q and R it is theoretically straightforward to determine matrix M. In practice, however, the exact values of s, Q, and R are often not known. Equation (7) also assumes that the camera center and the center of rotation are identical, which is typically only approximately true. However, this assumption may be sufficiently accurate for purposes of providing image stabilization. In the illustrated embodiment, camera 22 provides data, i.e., pan and tilt values for determining R and zoom values for determining s, on an image synchronized basis and with each image it communicates to processing device 50.

With this image specific data, the translation, rotation, and scaling of one image to align it with the second image can then be performed using the homographic method outlined above. In this method, a translation is a pixel motion in the x or y direction by some number of pixels. Positive translations are in the direction of increasing row or column index: negative ones are the opposite. A translation in the positive direction adds rows or columns to the top or left to the image until the required increase has been achieved. Image rotation is performed relative to an origin, defined to be at the center of the motion and specified as an angle. Scaling an image means making it bigger or smaller by a specified factor. The following approximations may be used to represent such translation, rotation and scaling:

$$x'=s(x \cos \alpha - y \sin \alpha)+t_x$$

$$y'=s(y \sin \alpha + x \cos \alpha)+t_y \quad (10)$$

wherein s is the scaling (zooming) factor.

$\alpha$ is the angle of rotation about the origin;

$t_x$ is the translation in the x direction; and $t_y$ is the translation in the y direction.

By introducing new independent variables $a_1=s \cos \alpha$ and $a_2=s \sin \alpha$, equation (10) becomes:

$$x'=a_1 x - a_2 y + t_x$$

$$y'=a_2 x + a_1 y + t_y \quad (11)$$

After determining $a_1$, $a_2$, $t_x$ and $t_y$, the two images, $I_1$ and $I_2$, can be aligned. If these values are obtained using zoom, pan and tilt values obtained directly from the camera, $t_x$ and $t_y$ will correspond to $\Delta P_1$ and $\Delta T_1$. If the transformed images display global image motion and are not properly aligned by this process, unintentional movement has occurred and the values of $\Delta P_E$ and $\Delta T_E$ can be determined for these transformed images using normalized cross-correlation.

Figure 4:
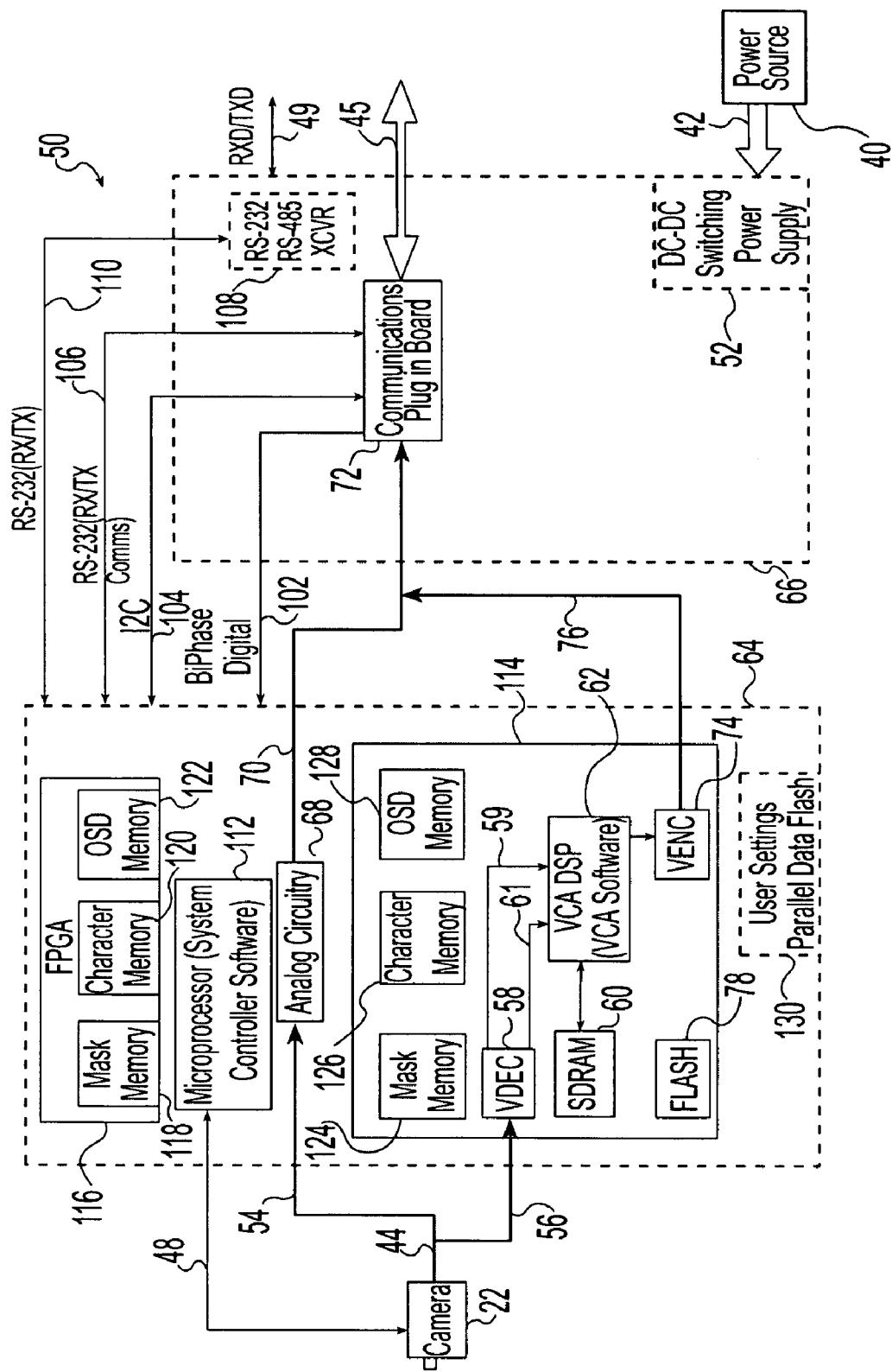
FIG. 4 is a block diagram of the processing device of FIG. 1.

The hardware architecture of processing device 50 is schematically represented in FIG. 4. In the illustrated embodiment, processing device 50 includes a system controller board 64 in communication with a power supply/IO board 66. A power line 42 connects power source 40 to converter 52 in order to provide power to processing device 50. Processing device 50 receives a raw analog video feed from camera 22 via video line 44, and video line 45 is used to communicate video images to head end unit 32. In the illustrated embodiment, video lines 44, 45 are coaxial, 75 ohm, 1 Vp-p and include BNC connectors for engagement with processing device 50. The video images provided by camera 22 can be analog and may conform to NTSC or PAL standards, variations of NTSC or PAL standards, or other video standards such as SECAM. When processing device 50 is inactive, i.e., turned off, video images from camera 22 can pass through processing device 50 to head end unit 32 through analog video line 54, analog circuitry 68, analog video line 70 and communications plug-in board 72. Board 72 can be a standard communications board capable of handling biphase signals associated with a Bosch physical interface and communications protocol for sending setup and control data to a pan and tilt or to an AutoDome®. Board 72 may be capable of handling a coaxial message integrated circuit (COMIC) Bosch proprietary control data over video protocol. Board 72 may be capable of handling a bi-directional communications protocol such as Bilinx™ for sending two-way communication over video links, such as by sending setup and control data to an AutoDome® over the video signal.

Via another analog video line 56, a video decoder/scaler 58 receives video images from camera 22 and converts the analog video signal to a digital video signal and separates the luminance (Y) component from the chrominance (U, V) components of the composite, color video signal. Video decoder/scaler 58 sends a full resolution (unscaled) digital video signal 59 to a video capture port of the VCA DSP 62. It also sends a scaled (sub-sampled horizontally by 4 and vertically by 4) QCIF image 61 produced by its scaler function to a second video capture port of VCA DSP 62. SDRAM memory 60 connects directly to VCA DSP 62 and provides volatile memory to store and execute the VCA software after boot, and to provide temporary memory storage. This temporary storage includes, but is not limited to the storage of video buffers. The video stabilization algorithm described above with reference to FIGS. 2 and 3 is performed in VCA DSP 62. The adjusted display image is sent via a DSP video display port to video encoder 74 where the chrominance and luminance components of the digital video signal are re-combined and the video signal is converted to an analog composite video signal. The resulting annotated analog video signal is sent via analog video lines 76 and 70 to communications plug-in board 72, which then sends the signal to head end unit 32 via video line 45.

In the illustrated embodiment, video input to system controller board 64 is limited to about 1.1 Vp-p and if the video signal exceeds 1.1 Vp-p without a proportional increase in sync level, then it will be clipped to about 1.1 Vp-p. If the video signal including the sync level is increased the video decoder/scaler 58 will attempt to compensate by reducing the video gain in order to regulate the sync level. However, alternative embodiments having a greater or lesser capacity may also be employed with the present invention. Processor 62 may be a TMS320DM642 programmable Video/Imaging Fixed-Point Digital Signal Processor available from Texas Instruments. At start up, processor 62 loads a bootloader program. The boot program then copies the VCA application code from a memory device such as flash memory 78 to SDRAM 60 for execution. In the illustrated embodiment, flash memory 78 provides four megabytes of memory and SDRAM 60 provides thirty-two megabytes of memory. In the illustrated embodiment, at most 4 MBytes of the 32 MBytes of SDRAM will be required to execute code and the remaining 28 MBytes of SDRAM is available for video buffers and other use.

In the embodiment shown in FIG. 4, system controller board 64 is connected to communications plug-in board 72 via a biphase digital data bus 102, an I2C data bus 104, and an RS-232 data bus 106. System controller board 64 is connected to an RS-232/RS-485 compatible transceiver 108 via RS-232 data bus 110. A line 49, which can be in the form of an RS-232 debug data bus, communicates signals from head end unit 32 to processing device 50. The signals on line 49 can include signals that can be modified by processing device 50 before being sent to camera 22. Such signals may be sent to camera 22 via line 48 in communication with microprocessor 112. Microprocessor 112 can operate system controller software and can communicate with VCA DSP 62 by means of a 16-bit interface such as the DSP's Host Peripheral Interface (HPI-16). Thus, VCA components such as VCA DSP 62 can send signals to camera 22 via microprocessor 112 and line 48.

System controller board 64 may also include a field programmable gate array 116 including a mask memory 118, a character memory 120, and an on screen display (OSD) memory 122. Similarly, VCA components 114 may include a mask memory 124, a character memory 126, and an on screen display (OSD) memory 128. These components may be used to mask various portions of the image displayed on screen 38 or to generate textual displays for screen 38. Finally, system controller board 64 can include a parallel data flash memory 130 for storage of user settings.

In the illustrated embodiment, the only necessary commands conveyed to processing device 50 that are input by a human operator are on/off commands and PTZ commands, however, even these on/off commands and PTZ commands may be automated in alternative embodiments. Such on/off commands and other serial communications are conveyed via bi-phase line 46 between head end unit 32 and camera 22, and between processing device 50 and camera 22 via line 48. In the illustrated embodiment, processing device 50 is mounted proximate camera 22, however, processing device 50 may also be mounted employing alternative methods and at alternative locations. Alternative hardware architecture may also be employed with processing device 50. Such hardware should be capable of running the software and processing at least approximately five frames per second for good results. It is also noted that by providing processing device 50 with a sheet metal housing its mounting on or near a PTZ camera is facilitated and system 20 may thereby provide a stand alone embedded platform which does not require a personal computer-based image stabilization system. If desired, however, the present invention may also be employed using a personal computer based system.

Processing device 50 can perform several functions, including capturing video frames acquired by camera 22, identifying a stationary feature in the video frames, determining the intended change in the camera FOV based upon signals sent to or received from camera 22, identifying a stationary feature and determining the actual change in the camera FOV, comparing the intended and actual change in the camera FOV to determine the magnitude of the image translations resulting from the unintentional motion of the camera and selecting display image coordinates to counteract the translations resulting from the unintentional motion of the camera. Processing device 50 may also be used to perform an automated tracking function. For example, processing device 50 may also provide an automated tracking system wherein processing device 50 is used to identify moving target objects in the FOV of the camera and then generate control signals which adjust the pan, tilt and zoom settings of the camera to track the target object and maintain the target object within the FOV of the camera. As the pan, tilt and zoom settings of the camera are automatically adjusted to track the target object, the images displayed by the system may be stabilized by utilizing an image stabilization system in accordance with the present invention. An example of an automated tracking system that may be employed by system 20 is described by Sablak et al. in U.S. patent application Ser. No. 10/306,509 filed on Nov. 27, 2002 entitled "VIDEO TRACKING SYSTEM AND METHOD" the disclosure of which is hereby incorporated herein by reference. An image stabilization system in accordance with the present invention may also be employed to stabilize images wherein the camera is being manually adjusted, such as by the manual manipulation of joystick 36 or in other applications.

Figure 5:
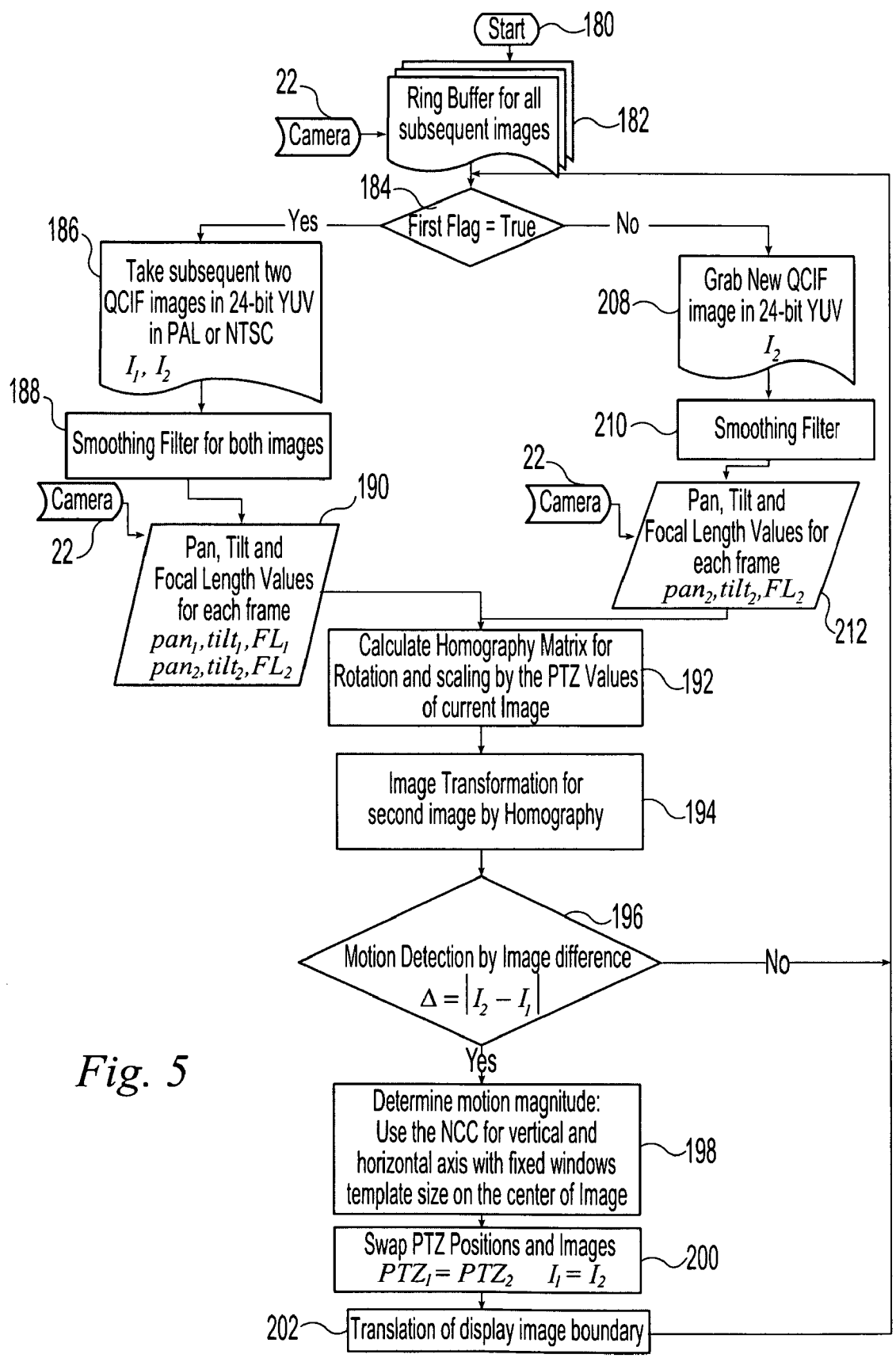
FIG. 5 is a flowchart representing one embodiment of the operation of the video surveillance system of FIG. 1.

FIG. 5 provides a flow chart which graphically illustrates the general logic of an embodiment of the video stabilization algorithm used by system 20 as described above. As shown in FIG. 5, after turning processing device 50 on, it is initialized at step 180 by copying the application code from flash memory 78 to SDRAM 60 for execution. Block 182 represents a part of the remaining memory of SDRAM 60 which is available as a ring buffer for storage of video image frames and data associated with each frame received from camera 22 and stored for processing by processor 62. At decision block 184, processor 62 determines if the first flag is true. The first flag is true only when no images from camera 22 have been loaded to SDRAM 60 for analysis by processor 62. Thus, when processing device 50 is turned on, the first time decision block 184 is encountered, the first flag will be true and processor 62 will proceed to block 186. Block 186 represents the grabbing of two QCIF images by processor 62. Processor 62 then proceeds to block 188 where a smoothing filter is applied to each image. Application of the smoothing filter involves blurring the images. The full-resolution images are sub-sampled by 4 horizontally and vertically to produce QCIF images (176H×120V NTSC or 176H×144V PAL). The sub-sampling process groups adjacent pixels together to define an average value for the grouped pixels. The purpose of the sub-sampling process is to reduce the time consumed by the computational processes involve in analyzing the image. Block 190 represents the acquisition of the pan, tilt and focal length (i.e., zoom) values for each of the images from the camera. (This data represents the intended values and does include the unintentional motion components of the pan and tilt values.) Although block 190 is shown at a location following the acquisition of the images, the pan, tilt and zoom data may be communicated by camera 22 to processing device 50 simultaneously with the images.

Next, block 192 represents the calculating of a homography matrix for rotation and scaling using the pan, tilt and zoom values of the current image. Then, in block 194, an image transformation is performed by homography to align the second image on to the first image. (If no pan, tilt or zoom adjustments to the camera have been made during the time interval between the acquisition of the two images, no transformation of the images is required.)

At block 196, the image difference of the two aligned images is calculated to determine if any motion is present in the images. Thus, after aligning images $I_1$ and $I_2$, the image difference, $\Delta$, is calculated in accordance with the following equation:

$$\Delta = |I_2 - I_1| \qquad (12)$$

A histogram of these differences is then calculated. The stationary background of the image will typically be responsible for generating the largest peak in the histogram. Thus, if the largest peak is centered around zero, the background of the two images is aligned and there has not been any unintentional camera movement during the interval between the acquisition of the two images. If this is the case, the process returns to decision box 184. If the largest peak in the histogram is not centered around zero, this indicates global motion, i.e., the background is in motion. This is interpreted as indicating unintentional motion of the camera and the process proceeds to box 198. It is also possible that a moving object will be located in the acquired images. If such a moving object is present in the images, the histogram will typically have two peaks associated with it, one corresponding to the background and one corresponding to the moving object. If this is the case, the background of the image is assumed to take up more area of the image than the moving object and the largest peak value is used to make the above determination. In other words, the histogram is evaluated to determine whether the largest peak of the histogram is centered on zero, indicating the absence of unintentional camera movement, or whether the largest peak indicates global movement, signifying the presence of unintentional camera movement. For example, FIG. 6 schematically depicts a histogram of image differences wherein the primary peak is centered on zero, indicating no unintentional camera movement, and also including a secondary peak 212 that is not centered on zero thereby indicating the presence of a moving object within the images.

If unintentional camera movement is detected and the system proceeds to block 198, the extent of the motion between the two images is determined using normalized cross-correlation (NCC). Because the transformation of the two images has already aligned the images in the manner predicted by the values representing $\Delta T_1$ and $\Delta P_1$, the process step of determining the motion that has occurred between the two images at box 198 corresponds to determining the value of $\Delta T_E$ and $\Delta P_E$.

Next, at block 200, the data for images $I_1$ and $I_2$ are swapped. The swapping of image data is done so that when a new image is grabbed and placed in the buffer after completing the translation of block 202, the new image and data associated therewith will overwrite the image and data associated with the older of the two images already present in the buffer.

Block 202 represents the translation of the display image boundaries on the CCD image of the most recently acquired image by amounts equivalent to $\Delta T_E$ and $\Delta P_E$ to thereby provide a stabilized video image.

The process then returns to block 184 where the first flag will no longer be true and the process will proceed to block 208 where a single new image will be grabbed and will overwrite image $I_2$ in the buffer. Processor 62 then proceeds to block 210 where the smoothing filter is applied to the new image. Block 212 represents the acquisition of the pan, tilt and zoom settings of the camera at the time the new image was acquired by the camera. The process then proceeds to block 192.

In the exemplary embodiment, camera 22 is continually acquiring new images and the computational analysis performed by processing device 50 to compare the current image with a previously acquired image takes longer than the time interval between the individual images acquired by camera 22. When processing device 50 completes its analysis of a set of images, it grabs the most recently acquired image for the next analysis. Thus, there may be one or more images that are captured and communicated by camera 22 that were captured between two images that are sequentially grabbed by processing device 50 for analysis. As a result, when it is determined at block 198 (in the flow chart of FIG. 5) that the display boundaries for the current image require adjustment to correct for the unintentional movement of the camera, several additional images will be acquired by camera 22 and displayed on monitor screen 38 before the next image stabilization analysis is completed. Setting the location of the display boundary in these additional unanalyzed images can be done in different manners. For example, the display boundary used with these additional images utilize the adjusted boundary position, e.g., display boundary 100, that resulted from the analysis of the last two grabbed images could be employed with the unanalyzed images until the stabilization process positively determined that the display boundary should be readjusted. Alternatively, after altering the display boundary for the one image which was specifically analyzed and determined to have been influenced by unintentional camera movement, the display boundary could be immediately returned to its centered location in the CCD display. In other words, the display boundary would remain at its centered location for all images except for those specific images which have been grabbed, analyzed and determined to have been affected by unintentional camera movement and for which an altered display image boundary is specifically determined. It is also possible for the display boundary to be returned to the centered location in the CCD image boundary in incremental amounts, over several sequentially acquired images, after the display boundary has been adjusted to account for unintentional camera movement.

In most surveillance camera applications, it is anticipated that the types of vibrations and other external forces acting on the camera will cause unintentional camera movements that have a very brief deviation from the intended position with possible oscillations about an equilibrium position corresponding to the intended position of the camera. In this type of situation, having the display boundary return immediately to the centered location can be beneficial. Returning to the centered position may not only reflect the underlying unintentional camera motion and thus facilitate the display of a stabilized image, it also prevents migration of the display boundaries to the edge of the CCD display image which could limit the effectiveness of the image stabilization process and could result from a process which does not return the display image boundaries to a centered location in the CCD image.

An automated video tracking system, in which a feature may be tracked automatically, i.e., without a human performing the tracking such as by use of a joystick, may be referred to as "autotracking". In another embodiment of the present invention, the autotracking and stabilization functions are combined into a single "stabilized autotracker" (SAT) algorithm. SAT may include four integrated software components: autotracker (AT) engine, stabilization software, virtual masking (VM) software, and SAT executive. Stabilization and AT may work separately, or simultaneously, as dictated by the SAT Executive.

A major advantage of the stabilized autotracker of the present invention is that it eliminates corner matching which may be used to compute the homography matrix. In the stabilized autotracker embodiment, frame accurate camera position (pan, tilt, zoom) may be used to generate the homography matrix. This is very desirable as approximately 50% of the processing execution cycle may be attributed to corner matching. Thus the elimination of corner matching alone, not taking into account the differences in CPU speed, may result in a doubling of the processing rate, such as from five frames per second to ten frames per second, for example.

Figure 7:
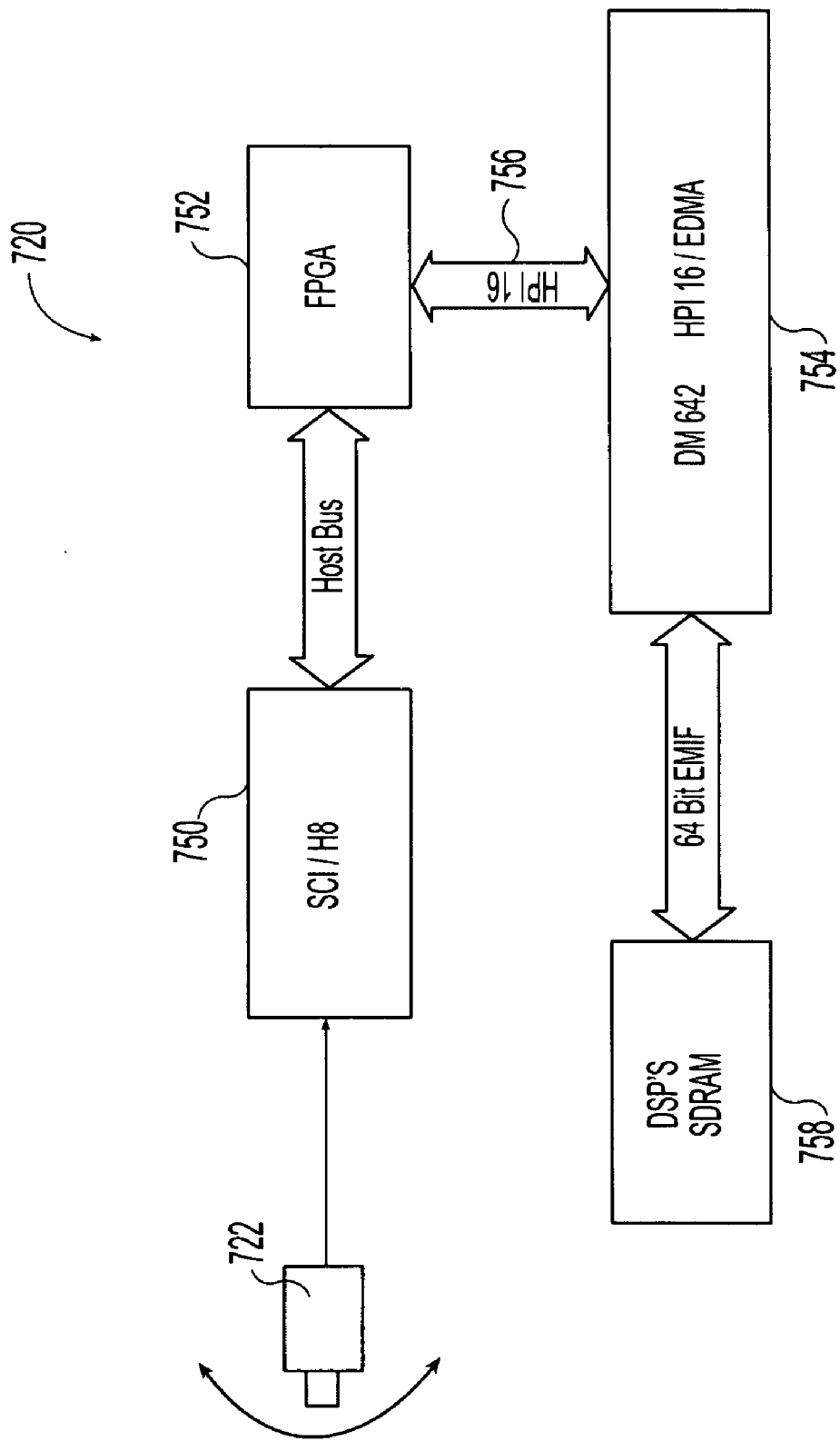
FIG. 7 is a block diagram of one embodiment of a video image stabilization system of the present invention.

A block diagram of one embodiment of a video image stabilization system 720 of the invention for performing frame accurate PTZ data transfer is shown in FIG. 7. A PTZ camera 722 may be in the form of a Philips AutoDome® Camera Systems brand camera system, such as the G4 AutoDome® camera and enclosure, which are available from Bosch Security Systems, Inc. formerly Philips Communication, Security & Imaging, Inc. having a place of business in Lancaster, Pa. Camera 722 may have, or be in communication with, three circuit boards, including a communications board, a system controller board, and a Video Content Analysis (VCA) board. The VCA board may be combined with the system controller board into a VCA system controller board. The VCA board may include a digital signal processor (DSP), such as a DM642 600 MHz processor available from Texas Instruments of Dallas, Tex. More particularly, camera 722 may send captured images and/or a motor position message to a host 750. Camera 722 may perform auto zoom reporting at a limit of 9600 baud, and each video frame may have a duration of 33.33 ms (NTSC) or 40 ms (PAL), for example.

The perceived zoom data may be transferred to field-programmable gate array (FPGA) 752 as soon as a zoom auto report is received and the perceived focal length is calculated. The perceived zoom data may be sent to FPGA 752 as two sixteen bit words.

There may be an autosend of the PTZ data by FPGA 752 to a digital signal processor (DSP) 754 via a host port interface (HPI) 756. As soon as the perceived data is received by FPGA 752, it may be combined with pan and tilt data, and may be sent as six sixteen bit words. The DSP interrupt may be set by FPGA 752. DSP 754 may have an SDRAM memory device 758 associated therewith.

The maximum frame delay from a frame may be approximately 6.3 milliseconds (ms), comprised primarily of a camera auto report having a duration of approximately 6.25 ms. Other components of the frame delay may include the interrupt latency of host 750 (1 µs), host processing (1 µs), FPGA writes (0.4 µs), FPGA transaction wait (0.4 µs), FPGA processing time (1 µs), EDMA sharing delays (0.5 µs), and DSP interrupt latency (1 µs).

HPI 756 may expose Video Content Analysis (VCA) RAM to read/write access for SC (System Controller), via FPGA 752. As such, VCA may reserve and publish fixed addresses for System Controller reference. These addresses may provide access to VCA RAM, with interrupts used to indicate new data.

The most frequently transferred data between SC and VCA may include dynamic data, such as camera position, and a status word (with bits such as Motion Detection disabled). VCA may also require large tables of data, which SC prepares at startup and subsequently notifies VCA when they are ready to be read. These tables may also be updated during operation, in which case the same notification technique may be used. Finally, VCA serial I/O, may be facilitated via the SC serial port. However, SC may have no interaction with the serial data, acting only as a pass-through agent.

The autotracker may process Quarter Common Intermediate Format (QCIF) images when stabilization is off, and 85% QCIF stabilized images when stabilization is turn on. Also, since the input to the autotracker may be "raw" video (i.e., without on screen display icons), most of the image may be used for tracking, as opposed to the top thirty lines not being usable because they are occupied with icons, text, etc.

In addition to the QCIF images, inputs to the autotracker algorithm include the camera pan, tilt and zoom positions, the camera height, and virtual masks. Outputs of the autotracker algorithm include the camera pan, tilt and zoom commands, and the autotracker state, e.g., OFF, Looking, Tracking, Fatal Error.

Figure 8:
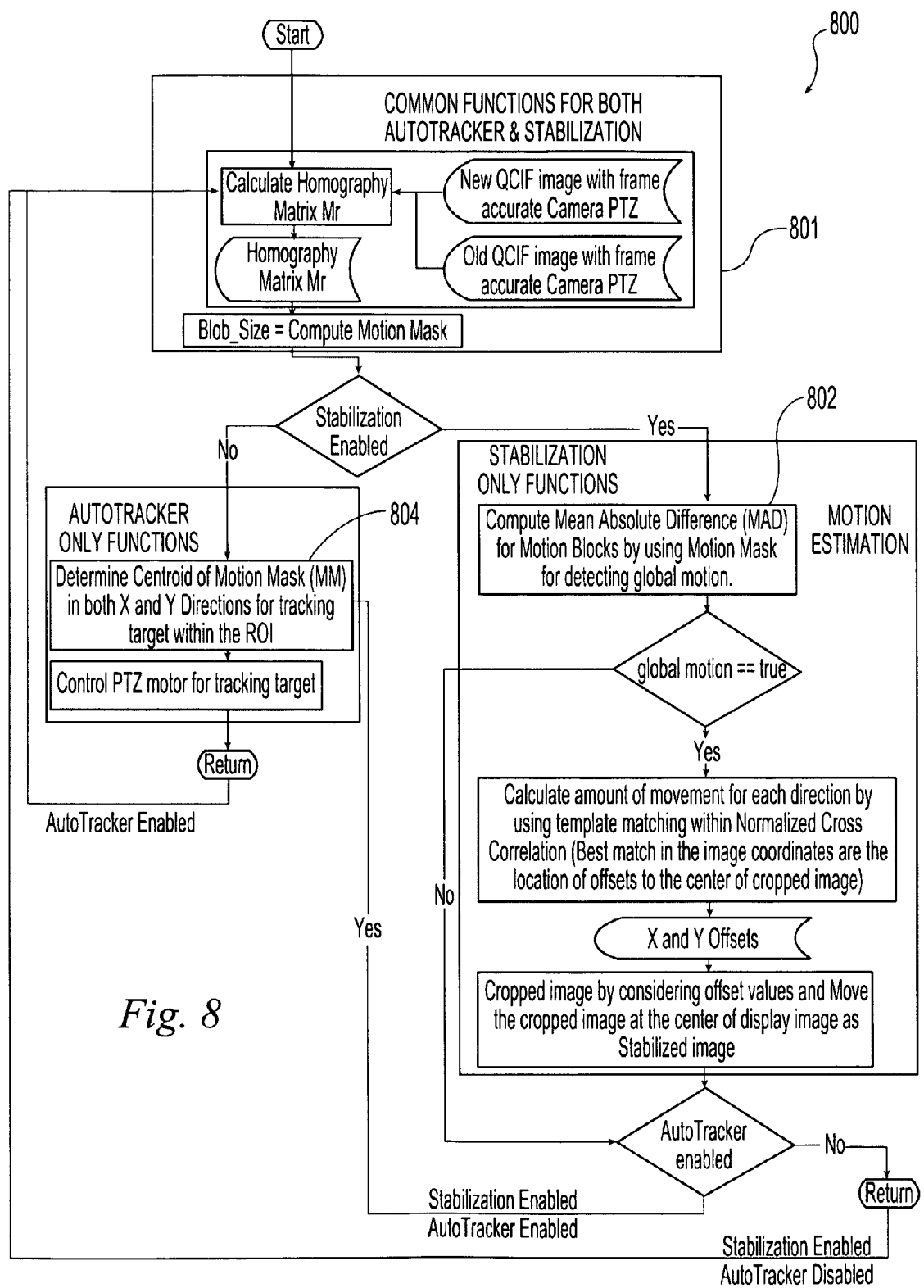
FIG. 8 is a flow chart of one embodiment of a stabilized autotracker method of the present invention.

FIG. 8 is a flow chart of one embodiment of a stabilized autotracker method 800 of the present invention. In a first step 801, a homography matrix is calculated based on a frame accurate position hardware-based technique. The last substep of step 801 (Blob_Size=Compute Motion Mask) corresponds to the motion detection method illustrated in FIG. 10.

One embodiment of a software module for executing step 802 is as follows:

```
k=0;
bl_count = 0;
global_motion = FALSE;
float MAD[6][8] - initialize all to zero.
blockSize = 10
for (i=0; i<CntrdH; i++)
{
    if (i%blockSize == 0)
        k++;
    l=0;
    for (j=0; j<CntrdW; j++ )
    {
        if(j%blockSize == 0)
            j++;
```

-continued

```
            imgNdx = i*CntrdW+j;
//          if( abs( ImgCentroid[0].plmg[imgNdx]-ImgCentroid[1].plmg
                [imgNdx])>STB_Threshold)
            if( MM[imgNdx] l = 0 )
                MAD[k-1][l-1]++;
    }
}
for ( i=0; i<6; i++ )
    for (j=0; j<8; j++ )
        if ( MAD[i][j] < 20 )
            bl_count++;
if (bl_count > 10)
    global_motion = TRUE; // there is no global motion
```

One embodiment of a software module for executing step 804 is as follows:

```
        (Basically the end of Compute_Motion_Mask( ).......
    for(i=top_row; i<bottom_row; i++)
    {
        //point to start of each row, then add the left column
        //offset.
offset = (i*m_cmd_width) + left_col;
        for(j=left_col; j<right_col; j++)
        {
        if (MM[offset] )
            {
            sum++;
                vp[i]++;
                hp[j]++;
            }
//move across the row to the next column.
        offset++;
        }//j index
    }// i index
    if(sum>5)
    {
        center.x = GetMedianAndSigmaFromCountingSort(sum, hp, hp1,
                                  &sgh, m_cmd_width; //160);
        center.y = GetMedianAndSigmaFromCountingSort(sum, vp, vp1,
                                  &sgv, m_cmd_height; //105);
        axes.width = int(sgh);
        axes.height = int(sgv);
        //Compute how far the center of motion has moved.
        int xdiff=abs(tempcenter.x-center.x);
        int ydiff=abs(tempcenter.y-center.y);
//This computes the "target consistency".
        //The target is inconsistent if
        //1) The target is too big - OR -
        //2) The target has moved too far
        if((axes.width < e1 && axes.height < e2)&&
            (xdiff<e4 && ydiff<e3))
            m_Target_Consistency_Flag = TARGET_IS_CONSISTENT;
        else
            m_Target_Consistency_Flag =
            TARGET_IS_NOT_CONSISTENT;
tempaxes.width=axes.width;
        tempaxes.height=axes.height;
        tempcenter.x=center.x;
        tempcenter.y=center.y;
    }
//    End of Computing Median of the image
        else
        {
            m_Target_Consistency_Flag =
            TARGET_IS_NOT_CONSISTENT;
            bilinear_mapping(M.a, center.x, center.y, &cx, &cy);
            center.x = int(cx+.1);
            center.y = int(cy+.1);
        }
```

Stabilization is the process whereby structural movement of the entire camera, i.e., "global" movement, may be dampened for presentation to the user. Stabilization may share much of the same video processing as autotracker (AT), and, therefore, stabilization and autotracker may be closely integrated. AT may determine if image stabilization is required and if stabilization is enabled. To stabilize an image, AT may pass a "raw" QCIF image to the stabilization algorithm, which may be used to match a half-size, warped "template", using cross correlation techniques. XY offsets may be generated via normalized cross correlation (NCC) and passed back to the AT algorithm. The template may be updated from the latest QCIF whenever the NCC score falls below a validity threshold, or when the camera position changes beyond a fixed threshold. Stabilization may also use the XY offsets to construct a stabilized D1 (720 by 480 pixels (National Television System Committee) or 720×576 (Phase Alternating Line)) output image, which may be cropped to compensate for the XY offsets.

In one embodiment of stabilization, a template measuring 160 by 120 pixels, for example, is provided within a same, predetermined area of each captured image. After compensating or accounting for known PTZ movements of the camera between two sequentially captured images, any global movements within the templates may be assumed to be due to jitter, i.e., unintentional movement or vibration. Instead of searching for a corner or some type of fixed object within the template images, the color, lightness and/or intensity values of each pixel in each of the two template images may be examined in order to determine whether there is a global positional shift in the values between the two template images. Any such global positional shift in the values between the two template images may be an indication that there was unintentional camera movement during the time interval between the capturing of the two images. The stabilization algorithm may effectively, via manipulation of the image data, reverse the positional shift in the image values that is due to unintentional movement. This reversal of the positional shift in the image data may effectively remove any perceptible jitter in the displayed images and stabilize the displayed images.

Figure 9:
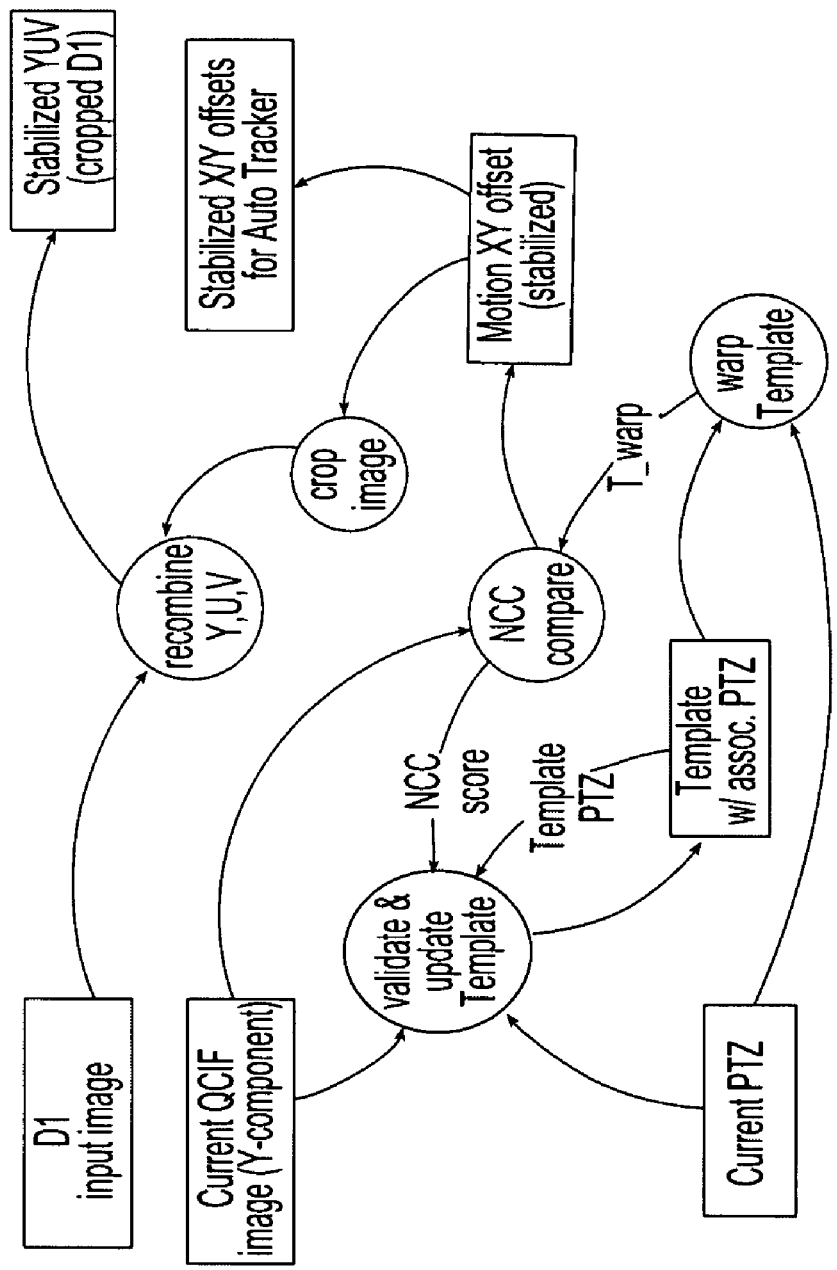
FIG. 9 is a data flow diagram of one embodiment of a stabilization algorithm of the present invention.

Inputs to the stabilization may include the D1 image, YUV colorspace components, the QCIF image, the Y component, and the current PTZ positions. Outputs of the stabilization may include the stabilized image YUV color components, and stabilized Y-component X/Y offsets for autotracker. FIG. 9 is a data flow diagram of one embodiment of the stabilization algorithm of the present invention.

Motion detection may be accomplished via the autotracker algorithm. Instead of providing PTZ commands to the system controller when motion is detected, the VCA may provide a motion notification. This motion detector may be able to specify regions of interest and find motion specifically assigned in the region of interest (ROI). The algorithms for drawing regions of interest may be similar as those used by the privacy masking software on the system controller central processing unit (CPU).

The ROI motion detection algorithm may differ from privacy masks in two important aspects. First, wherein privacy masks may be applied directly to input video to prevent the user from seeing what is behind the masks, the ROI motion detection may be applied directly to the computed motion mask to inhibit motion detection software from having the interested areas contribute to detected motion. Second, ROI motion mask positions are not warped and dynamically changed depending upon camera position changes. The positions of ROIs are fixed onto the motion mask based upon the preset camera positions.

Inputs to the motion detection may include the motion mask that is computed by the autotracker. The ROI may also be an input to the motion detection. Each ROI may include a set of vertices, the number of vertices, and the camera preset position number when the ROI was created. Another input to the motion detection may be the p_Number, i.e., the current camera preset position number.

Figure 10:
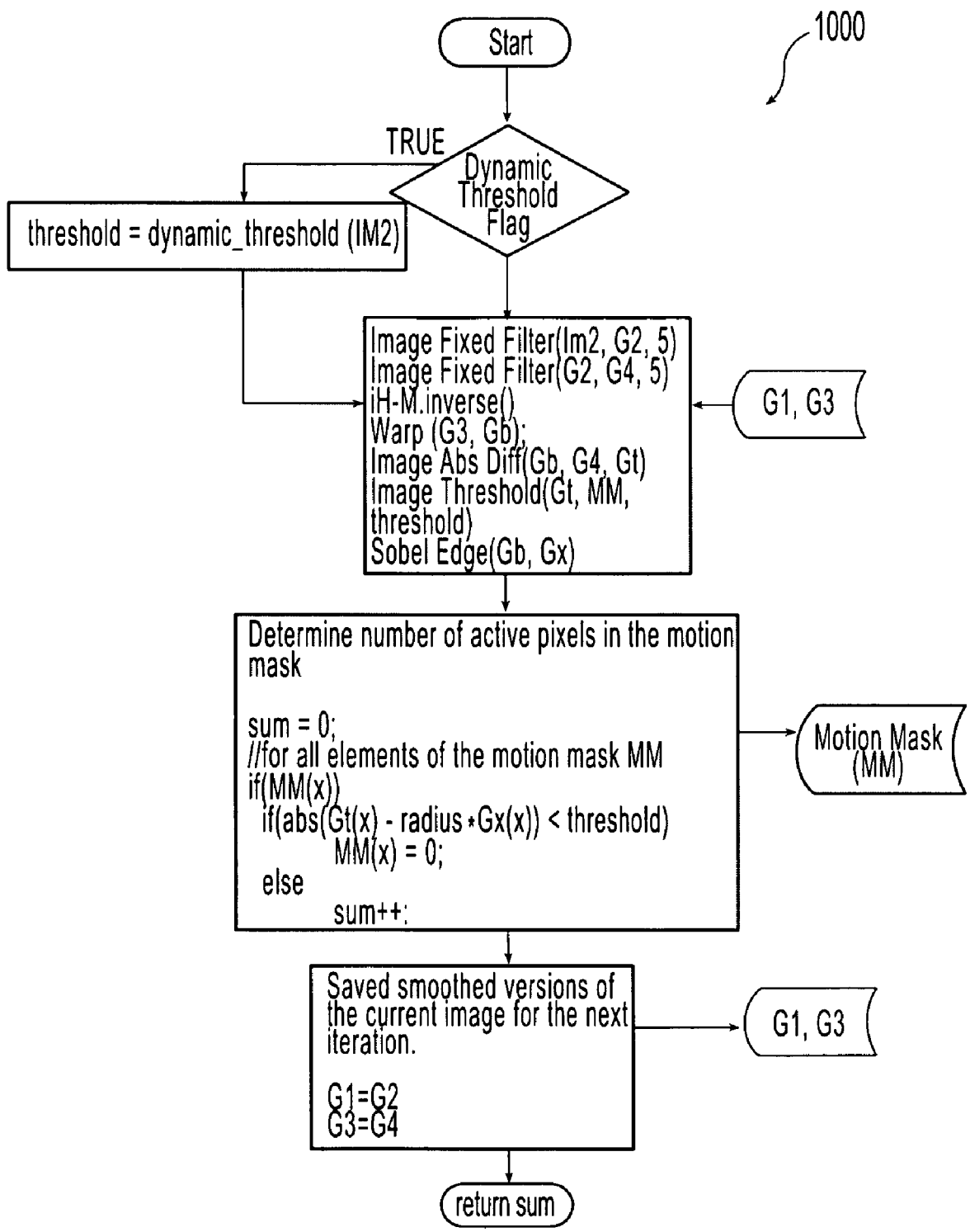
FIG. 10 is a flow chart of one embodiment of a motion detection method of the present invention.

The output of the motion detection system may be an indication of whether or not motion is present in the ROI. Motion outside of the ROI is not considered. With regard to the data structure of the motion detection, each ROI may be formed of a set of vertices, the number of vertices, and the camera preset position when the mask was created. FIG. 10 is a flow chart of one embodiment of a motion detection method 1000 of the present invention.

Figure 11:
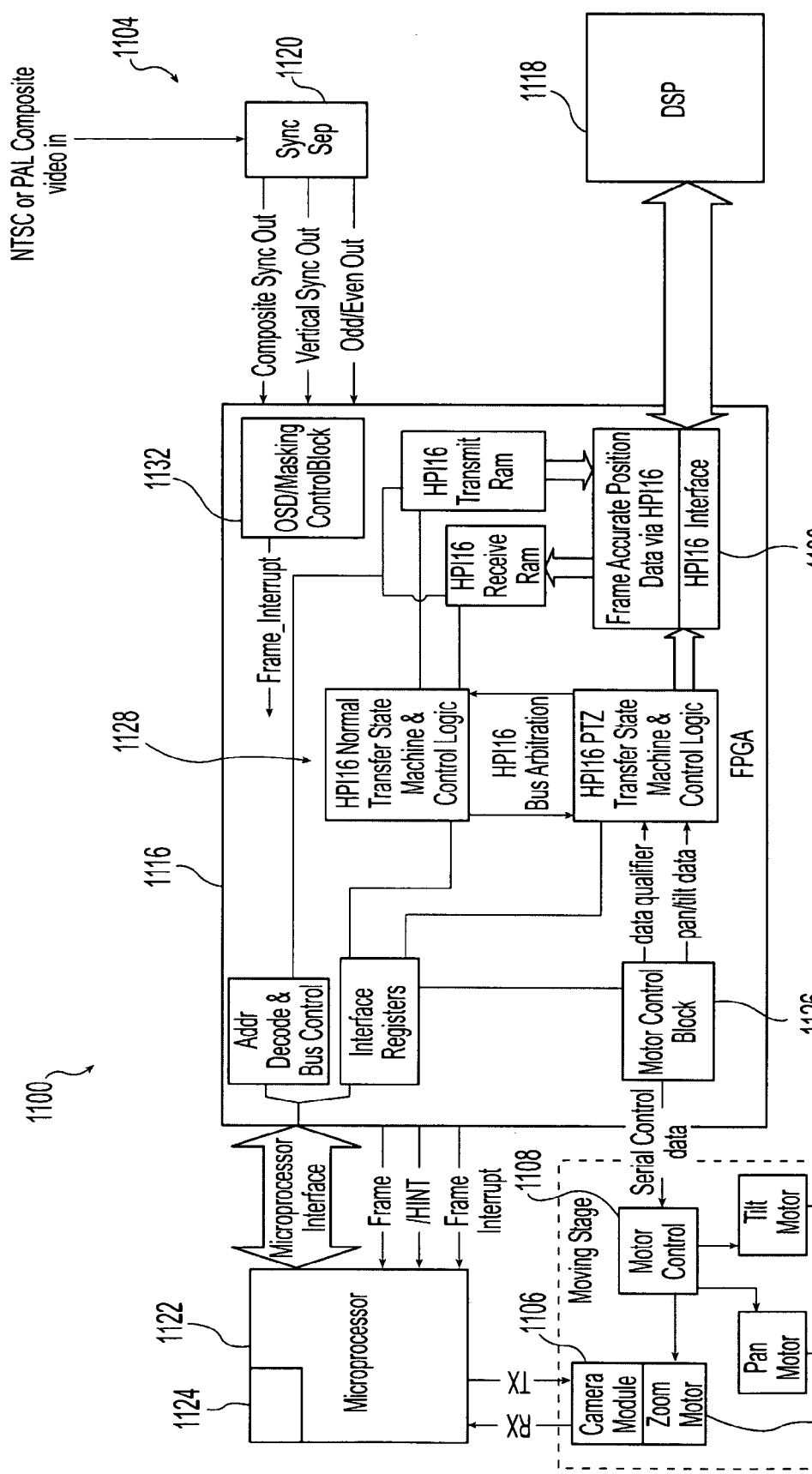
FIG. 11 is a block diagram of another embodiment of a video system of the present invention for producing frame accurate position data in a PTZ dome camera with open loop control.

System 720 of FIG. 7 may produce frame accurate position data in accordance with the present invention. FIG. 11 is a more detailed illustration of another embodiment of a video system 1100 of the present invention for producing frame accurate position data in a PTZ dome camera with open loop control. System 1100 includes a moving stage 1102 and a fixed stage processing device 1104. Moving stage 1102 may include a camera module 1106 and a motor controller 1108 for controlling a camera actuator in the form of a pan motor 1110, a tilt motor 1112, and a zoom motor 1114. Camera module 1106 may include a camera that is similar to camera 22 and associated control electronics. Zoom motor 1114 is depicted as being attached to, or part of, camera module 1106 because zoom motor 1114 may be an internal component of the camera that changes the position of a lens within the camera. In contrast, pan motor 1110 and tilt motor 1112 are depicted as being separate from camera module 1106 because pan motor 1110 and tilt motor 1112 are typically disposed outside the housing of the camera such that they may actuate the entire camera, including the camera housing.

Motor controller 1108 may transmit movement commands to pan motor 1110, tilt motor 1112 and zoom motor 1114 that instruct the motors to actuate the camera in terms of the magnitude and direction of the desired movement. The control electronics of camera module 1106 may also automatically produce camera zoom position information at a video frame rate based upon the received zoom commands. The camera zoom position information may include zoom multiplication factor data, and processing device 1104 may match the zoom multiplication factor data with pan position data and tilt position data. The camera zoom position information may specify the degree of zoom to be achieved by the zoom commands in terms of focal length or a zoom lens multiplication factor, for example. A frame interrupt signal may be used to initiate the sending of zoom data from camera module 1106 via serial communication. That is, camera module 1106 may transmit the camera zoom position information via serial communication in response to a frame interrupt.

Fixed stage processing device 1104 may use calculated field of view data to determine a desired location of a mask in an image or to track movement of an object of interest in the image. The field of view data may be calculated based upon the movement commands sent to the camera motors. Processing device 1104 may include field programmable gate array (FPGA) circuitry 1116, a digital signal processor (DSP) 1118, video synchronization separation circuitry 1120, and a host microprocessor 1122 including memory 1124. FPGA circuitry 1116 includes a motor control block 1126 that may transmit movement commands in the form of serial control data to motor controller 1108. The movement commands issued by motor controller 1108 may be based upon the serial control data movement commands from block 1126, and may be parsed versions of the movement commands from block

1126. FPGA circuitry 1116 may also include a state machine 1128, an HPI16 interface 1130, and an OSD/Masking Control Block 1132.

Processing device 1104 may produce frame accurate position data based upon the movement commands from motor control block 1126. The frame accurate position data may define the camera field of view corresponding to each image frame acquired by the camera.

Figure 12A:
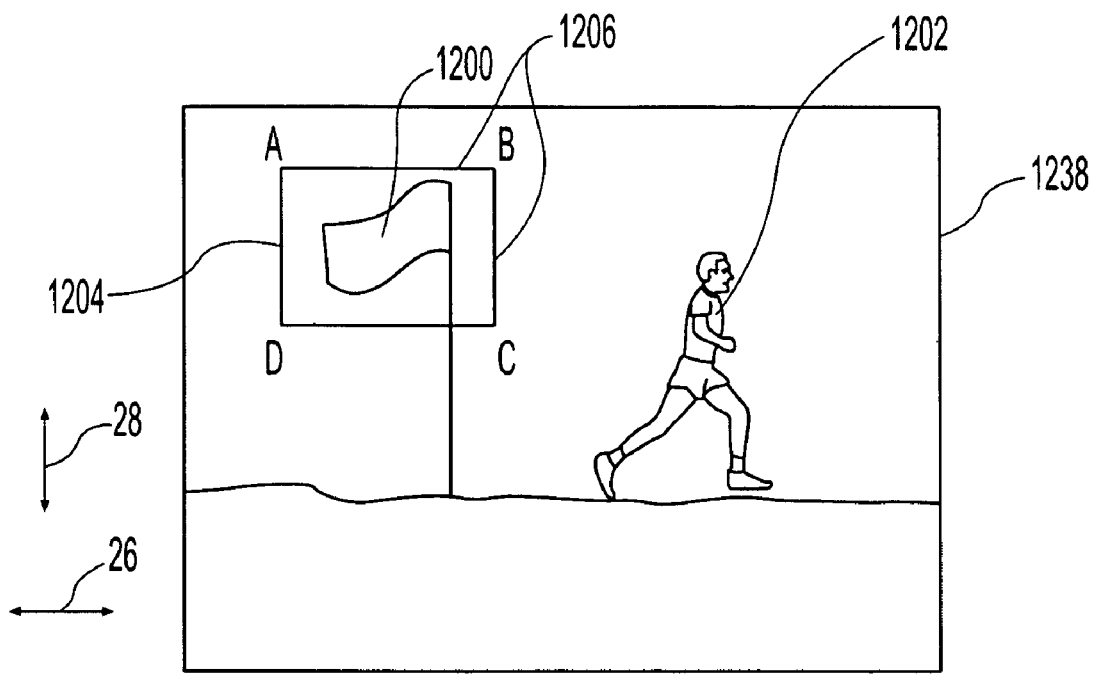
FIG. 12a is a plan view of an image acquired by the camera and displayed on a screen with a virtual mask.
Figure 12B:
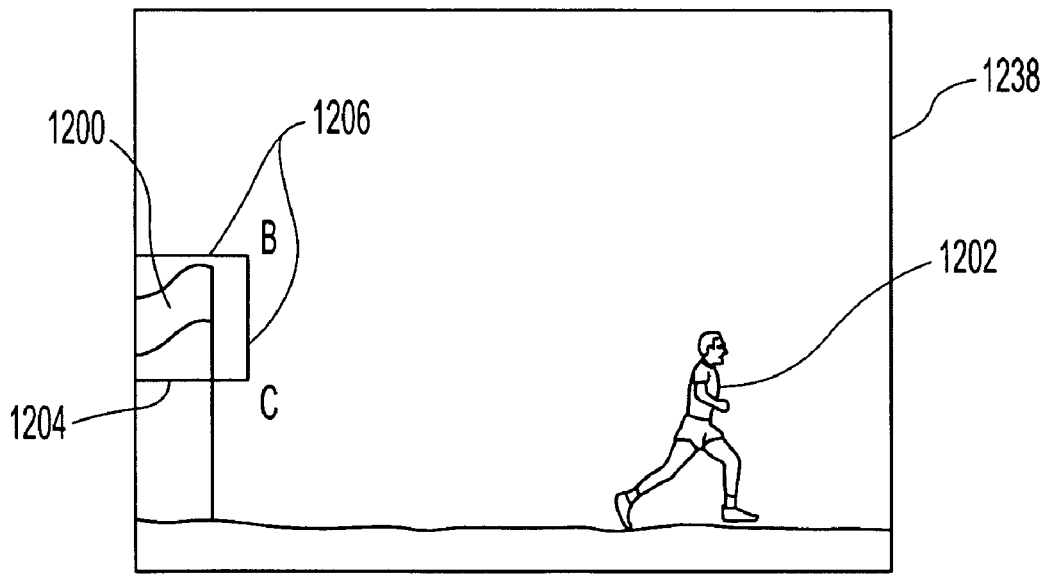
FIG. 12b is a plan view of a subsequent image, similar to the image of FIG. 12a, acquired by the camera with a different field of view and displayed on a screen with a virtual mask.

FIGS. 12*a* and 12*b* illustrate sequentially acquired images, the processing of which may utilize the frame accurate position data produced by the present invention. FIG. 12*a* illustrates an image that has been acquired by camera module 1106 and that is being displayed on a screen 1238. The image includes a source of static motion in the form of a flag 1200 that is rippling in the wind. The image also includes a moving object of interest in the form of a person 1202 who is running. It may be desirable for the processing device to identify person 1202 as a moving object of interest and for the camera to follow the movements of person 1202. That is, the camera may automatically track person 1202 ("autotracking") in order to prevent the continued movement of person 1202 from resulting in person 1202 moving outside the field of view of the camera. Although the field of view of the camera may be larger than what is shown on screen 1238, both in the pan direction 26 and the tilt direction 28, it may be assumed for ease of illustration that the entire field of view is displayed on screen 1238.

A user of system 1100 may view screen 1238 and identify flag 1200 as a potential source of static motion in the field of view of the camera. In order to enable processing device 1104 to track person 1202 with little or no regard for the static motion of flag 1200, the user may define a virtual mask 1204 to "cover" the static motion of flag 1200. That is, areas of the acquired image that are within virtual mask 1204 include the source of static motion 1200. The user may define virtual mask 1204 by drawing a visual representation of virtual mask 1204 on screen 1238. In one embodiment, the user selects vertices A, B, C, D of mask 1204 on screen 1238 such as by use of a joystick such as joystick 36 or a computer mouse (not shown). After the user has selected vertices A-D, processing device 1104 may add to the display visible boundary lines 1206 which join adjacent pairs of the vertices.

Processing device 1104 may analyze and compare a number of images that have been sequentially acquired to thereby sense movement within the acquired images. For example, by comparing the image of FIG. 12*a* with the subsequently acquired image of FIG. 12*b*, processing device 1104 may sense the movement of flag 1200 and of person 1202. More particularly, each of the images may be acquired as a matrix of pixels, as is well known. Processing device 1104 may compare corresponding pixels in the sequentially acquired images in order to determine if the content of each particular pixel changes from image-to-image. If the content of a pixel does change from image-to-image, then it may be an indication that there is movement within that particular pixel.

Because of the presence of virtual mask 1204, any movement of flag 1200 may be ignored when searching for a moving object of interest. Thus, it may be important to accurately translate the location of mask 1204 in FIG. 12*a* to a corresponding desired location in FIG. 12*b* such that mask 1204 continues to "cover" flag 1200 in FIG. 12*b*.

However, before the location of mask 1204 can be translated to FIG. 12*b*, and before the pixels in the two images can be compared, it may be necessary to account for the changes in the field of view of the camera between FIGS. 12*a* and 12*b*. The changes in the field of view may be due to camera movements, in response to movement commands, that have commenced after the image of FIG. 12*a* was acquired and before the image of FIG. 12*b* was acquired. Obviously, if mask 1204 were moved to the same location in FIG. 12*b* at which it is disposed in FIG. 12*a*, flag 1200 would not be covered thereby in FIG. 12*b*. It may be easily observed that the camera's field of view has moved to the right and upward between FIGS. 12*a* and 12*b*, and further that the camera has zoomed out, as evidenced by both flag 1200 and person 1202 being smaller in FIG. 12*b*.

Figure 13A:
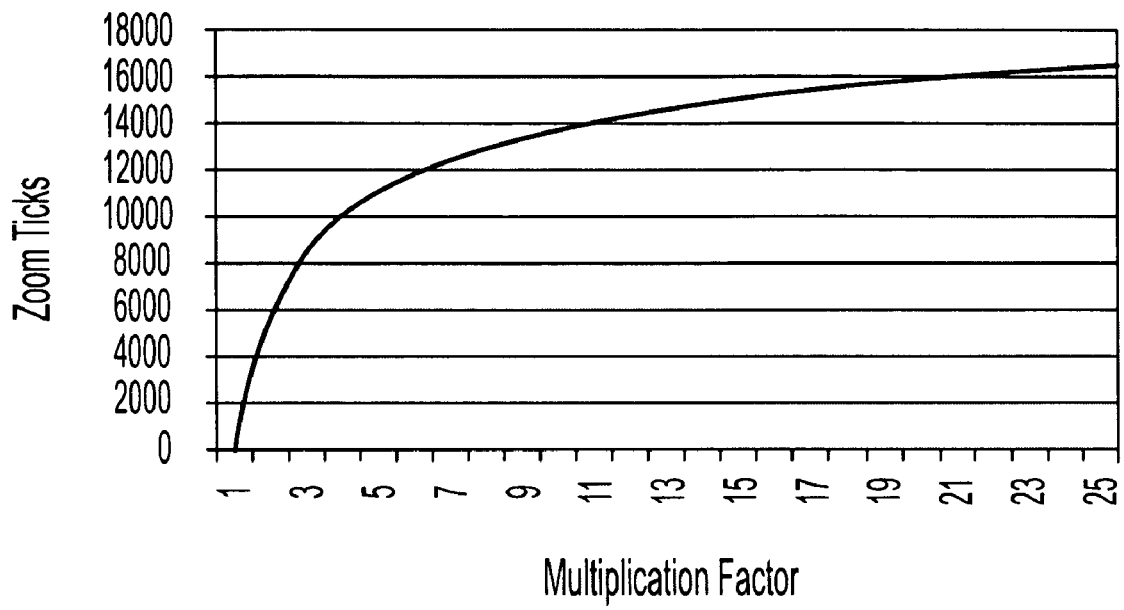
FIG. 13a is an exemplary plot of zoom ticks of the zoom camera motor of FIG. 11 versus a resulting zoom multiplication factor.
Figure 13B:
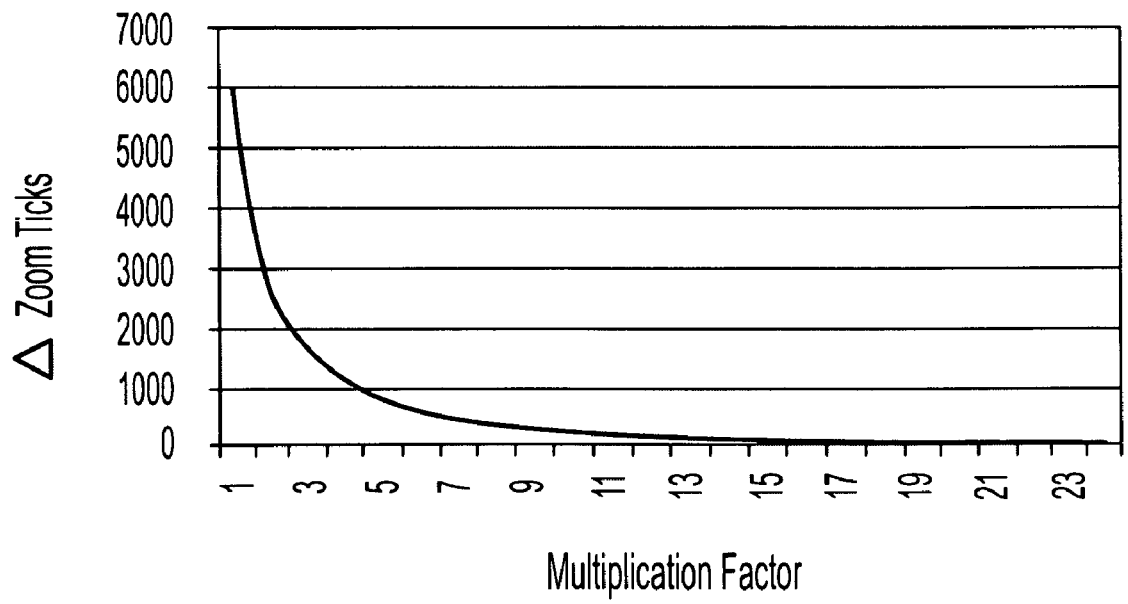
FIG. 13b is an exemplary plot of the change in zoom ticks required to produce an increment in the zoom multiplication factor versus the current zoom multiplication factor.

Processing device 1104 may calculate the effect of the pan movement commands and tilt movement commands on the field of view on a frame-by-frame basis. The field of view may be defined by a pan position, a tilt position, and a zoom multiplication factor. The zoom movement commands may be expressed in terms of a number of "ticks", i.e., incremental movements, of a zoom stepper motor 1114. The effect of a single tick on the zoom "position", i.e., the zoom multiplication factor or perceived focal length, may not be linear, however. FIG. 13*a* is a plot of zoom ticks versus the zoom multiplication factor of an exemplary 25× zoom lens. The zoom multiplication factor may be multiplied by the minimum focal length of the lens to thereby obtain the focal length. FIG. 13*b* is essentially the inverse of FIG. 13*a*, illustrating the number of zoom ticks required to achieve each succeeding incremental change in the zoom multiplication factor.

Camera module 1106 may convert zoom movement commands into zoom position information, such as zoom ticks. Conversion information, such as that shown in FIGS. 13*a* and 13*b*, may be stored in memory 1124 for use by microprocessor 1122 in converting the zoom position information in the form of zoom ticks into camera zoom position information such as a multiplication factor from which the perceived focal length may be derived. The conversion information may be stored in the form of a lookup table or a formula, for example. Processing device 1104 may relate the zoom commands to positions of the zoom stepper motor, and may access stored conversion information relating the positions of the zoom stepper motor to the zoom multiplication factor.

The calculated field of view data, including pan position data, tilt position data, and zoom multiplication factor data, may be stored in memory 1124. DSP 1118 of processing device 1104 may respond to a field interrupt signal from the DSP video port via register settings in DSP 1118 by retrieving the field of view data and matching it to respective frames being processed. In the context of "field interrupt", the term "field" refers to the two fields that comprise a video frame, as is known in the art. Processing device 1104 may respond to a field interrupt signal by retrieving field of view data stored in memory 1124, and matching the field of view data to a frame being processed. More particularly, a field interrupt signal may be used to initiate reading of SDRAM of DSP 1118 to retrieve data written by FPGA 1116 as a means of matching position data to the frame being processed. The retrieved field of view data may include pan position data associated with a privacy or virtual mask and/or tilt position data associated with a privacy or virtual mask. The calculations of the field of view data, including calculated changes in pan, tilt and zoom positions, may be initiated and completed between a point in time at which a frame interrupt signal is issued and a second point in time at which a response signal is issued.

A write of perceived focal length data, or zoom multiplication data, to FPGA 1116 may trigger the automatic matching of that data with pan and tilt data. The write of the perceived focal length data to FPGA 1116 may also initiate state machine 1128 to automatically transfer data over parallel interface 1130 to DSP 1118 and to set an interrupt in DSP 1118. State machine 1128 may have priority over a normal transaction state machine in order to reduce transfer latency.

Updated versions of the calculated PTZ positions may be automatically transmitted to DSP 1118 for each subsequent video frame. The automatic position updates to DSP 1118 may reduce the latency of matching zoom data, in the form of perceived focal length, with pan and tilt data. The automatic position updates to DSP 1118 may also reduce the latency of the transfer mechanism in order to produce frame accurate position data. Thus, FPGA circuitry 1116 may receive zoom data from the host every video frame, i.e., at the same frequency as video frames (33.33 ms NTSC, 40 ms PAL), via two sixteen bit words. Upon receipt of this data, FPGA circuitry 1116 may wait until any normal transactions that are in progress are completed, perform transfer of the latest PTZ data, and set DSP interrupt (DSPINT) within DSP 1118.

A qualifier may be used within FPGA circuitry 1116 to determine that the latest pan and/or tilt data cannot be changing at the time it is matched with the zoom data for transfer. Thus, normal transactions may be kept short relative to the transfer time of the zoom data from the camera. The transfer of the zoom data may take approximately 6.25 ms, and 20EA thirty-two bit words can be transferred to DSP 1118 in less than 8 μs. In other words, the PTZ data may be within the DSP's SDRAM within 7 ms after the start of the video frame. The DSP section itself may use the video decoder or video port to determine when the second field of the video frame occurs to generate an interrupt and then may use the data sent by FPGA circuitry 1116. Thus, the data may be accurate to the frame currently being processed because the data may be sent during the first field of the frame and may be read during the second field.

After motor control block 1126 of FPGA circuitry 1116 has calculated and issued the motor movement commands, processing device 1104 may calculate the resulting camera position data and generate a digital signal indicating the validity of the calculated field of view, i.e., the camera position data. The validity of the calculated camera position data may be based upon a length of time since the motor movement commands were issued. Generally, the longer the time period that has transpired since the motor movement commands were issued, the less validity the associated calculated camera position data will have. That is, the longer the time period that has transpired since the motor movement commands were issued, the less likely it is that the current calculated camera position data is accurate for the frame currently being processed. Processing device 1104 may calculate the field of view of the camera as a function of time dependent upon the pan, tilt and zoom commands. Processing device 1104 may output both the calculated field of view and a qualification of the calculated field of view. The qualification may be an indication of the validity of the calculated field of view based upon a point in time associated with the calculated field of view. The qualifications may be useful to video system 1100, or to an external system, in processing the images acquired by the camera.

The qualification of the calculated field of view may be in the form of a point in time or a particular frame corresponding to the calculated field of view. That is, for example, a reference number may be assigned to each frame, and the calculated field of view may be matched to the reference number of the frame for which the field of view was calculated.

In another embodiment, tables of curves may be used to calculate zoom position movement from the time of frame interrupt to the time of the response signal based upon the movement speed and the current or last known tick position. The implementation of this embodiment may be advantageous when auto zoom reporting is not available from the camera module.

While this invention has been described as having an exemplary design, the present invention may be further modified within the spirit and scope of this disclosure. This application is therefore intended to cover any variations, uses, or adaptations of the invention using its general principles.

What is claimed is:

1. A method of processing video images, comprising:
    capturing a first image with a camera having a first field of view, said capturing occurring at a first point in time;
    receiving a user input defining a virtual mask in the first image, the virtual mask substantially covering a source of static motion in the first image;
    transmitting commands to said camera to make pan, tilt and zoom movements;
    capturing a second image with said camera at a second point in time, the second point in time being after the movements have commenced;
    calculating a second field of view of said camera at the second point in time, said calculating being based upon the commands, and wherein the calculating step calculates the second field of view of said camera as a function of time dependent upon the pan, tilt and zoom commands;
    outputting both the calculated second field of view and a qualification of the second calculated field of view, the qualification providing an indication of the validity of the calculated second field of view based upon a length of time that has elapsed between a time of execution of the pan, tilt and zoom commands and the second point in time; and
    processing the second image based upon the first field of view and the calculated second field of view, wherein said processing step includes translating the virtual mask to a proper location in the second image so that the virtual mask substantially covers the source of static motion in the second image.

2. The method of claim 1 wherein said processing step includes determining movement of an object of interest between the first image and the second image without regard for the source of static motion covered by the virtual mask within the first and second images.

3. The method of claim 1 wherein the first field of view and the second field of view are each defined by a pan position, a tilt position, and a zoom multiplication factor, the commands including pan, tilt, and zoom commands, said calculating step including converting the zoom commands into the zoom multiplication factor.

4. The method of claim 3 wherein said converting includes accessing stored conversion information relating positions of a zoom stepper motor to the zoom multiplication factor.

5. The method of claim 3 wherein said calculating step is initiated and completed between a time of a frame interrupt and a time of a response signal.

6. The method of claim 1, further comprising displaying boundary lines of the virtual mask in the first and second images.

7. A video system comprising:
    a video camera including an image-capturing device configured to capture images, each captured image associated with a field of view of said camera;
    a display device configured to display the images captured by said camera;

an actuating device configured to cause said camera to execute pan, tilt and zoom commands to thereby change the field of view of said camera;

a user input to define a virtual mask in a first captured image, the virtual mask substantially covering a source of static motion in the first captured image;

a camera module configured to automatically produce camera zoom position information based upon the zoom commands; and a processing device operably coupled to said camera and to said display device wherein said processing device receives images captured by said camera, said processing device being operable to calculate the field of view of said video camera as a function of time dependent upon the pan commands, the tilt commands, and the camera zoom position information and to output both the calculated field of view and a qualification of the calculated field of view, the qualification providing an indication of the validity of the calculated field of view based upon a length of time that has elapsed between the time of execution of the pan, tilt and zoom commands and the time the field of view was calculated, and said processing device being operable to translate the virtual mask to a proper positions in subsequently captured images to substantially cover the source of static motion in the subsequently captured images and to track movement of an object of interest in the subsequently captured images without regard for the source of static motion covered by the virtual mask within the captured images.

8. The video system of claim 7 wherein said camera module is configured to automatically update the camera zoom position information for each subsequent video frame.

9. The video system of claim 7 wherein said camera module is configured to transmit the camera zoom position information via serial communication in response to a frame interrupt.

10. The video system of claim 7 wherein said camera module is configured to calculate a change in zoom position between a time of the frame interrupt and a time of a response signal.

11. The video system of claim 7 wherein said processing device includes a memory device, said processing device being configured to respond to a field interrupt by retrieving field of view data stored in said memory device, and matching the field of view data to a frame being processed.

12. The video system of claim 11 wherein the retrieved field of view data includes pan position data associated with the virtual mask and tilt position data associated with the virtual mask.

13. The video system of claim 7 wherein the field of view is defined by a pan position, a tilt position, and a zoom multiplication factor, the camera zoom position information including zoom multiplication factor data, said processing device being configured to match the zoom multiplication factor data with pan position data and tilt position data.

14. The method of claim 7, wherein the processing device is operable to display boundary lines of the virtual mask in the captured images on the display.

15. A video system comprising:

a video camera including an image-capturing device configured to capture images, each captured image associated with a field of view of said camera;

a display device configured to display the images captured by said camera;

an actuating device configured to cause said camera to execute pan, tilt and zoom commands to thereby change the field of view of said camera; and a processing device operably coupled to said camera and to said display device wherein said processing device receives images captured by said camera, said processing device being operable to calculate the field of view of said video camera as a function of time dependent upon the pan, tilt and zoom commands, and to output both the calculated field of view and a qualification of the calculated field of view, the qualification providing an indication of the validity of the calculated field of view based upon a length of time that has elapsed between the time of execution of the pan, tilt and zoom commands and the time the field of view was calculated.

16. The system of claim 15 wherein said processing device is operable to output both the calculated field of view and a frame corresponding to the calculated field of view.

17. The system of claim 15 wherein said processing device includes field programmable gate array circuitry.

18. The system of claim 15 wherein said processing device is operable to generate at least one of said pan commands, tilt commands and zoom commands.

19. The system of claim 15 wherein said processing device is operable to generate a digital signal indicating validity of the calculated field of view.

20. The system of claim 15 wherein said actuating device includes a zoom stepper motor, the calculated field of view including a zoom multiplication factor, said processing device being configured to relate the zoom commands to positions of said zoom stepper motor, and to access stored conversion information relating the positions of said zoom stepper motor to the zoom multiplication factor.

21. The system of claim 15 wherein said processing device is configured to use the calculated field of view to at least one of:

determine a desired location of a mask in an image; and track movement of an object of interest in the image.

22. The system of claim 15, further comprising a user input to define a virtual mask in a first captured image, the virtual mask substantially covering a source of static motion in the first captured image; the processing device being operable to translate the virtual mask to a proper positions in subsequently captured images to substantially cover the source of static motion in the subsequently captured images.

23. The system of claim 22, wherein the processing device is operable and to track movement of an object of interest in the captured images without regard for the source of static motion covered by the virtual mask within the captured images.

24. The method of claim 15, wherein the calculated field of view becomes less valid as the length of time that has elapsed between the time of execution of the pan, tilt and zoom commands and the time the field of view was calculated increases.

25. A method of processing video images, comprising:

capturing a first image with a camera having a first field of view, said capturing occurring at a first point in time;

transmitting commands to said camera to make pan, tilt and zoom movements;

capturing a second image with said camera at a second point in time, the second point in time being after the execution of the pan, tilt and zoom commands;

calculating a second field of view of said camera as a function of time dependent upon the pan, tilt and zoom commands, processing the second image based upon the first field of view and the calculated second field of view; and outputting both the calculated second field of view and a qualification of the second calculated field of view, the qualification providing an indication of the validity of the calculated second field of view based upon a length of time that has elapsed between a time of execution of the pan, tilt and zoom commands and the second point in time.

26. The method of claim 25, further comprising receiving a user input defining a virtual mask in the first image, the virtual mask substantially covering a source of static motion in the first image, the processing step including translating the virtual mask to a proper location in the second image so that the virtual mask substantially covers the source of static motion in the second image.

27. The method of claim 26, wherein said processing step includes determining movement of an object of interest between the first image and the second image without regard for a source of static motion covered by the virtual mask within the first and second images.

28. The method of claim 26, wherein the calculated field of view becomes less valid as the length of time that has elapsed between the time of execution of the pan, tilt and zoom commands and the time the field of view was calculated increases.

* * * * *

UNITED STATES PATENT AND TRADEMARK OFFICE
CERTIFICATE OF CORRECTION

PATENT NO. : 7,643,066 B2 Page 1 of 1
APPLICATION NO. : 11/294847
DATED : January 5, 2010
INVENTOR(S) : Henninger, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1008 days.

Signed and Sealed this

Twenty-first Day of December, 2010

David J. Kappos
*Director of the United States Patent and Trademark Office*